(12) United States Patent
Ishibashi et al.

(10) Patent No.: US 11,093,436 B2
(45) Date of Patent: Aug. 17, 2021

(54) ARITHMETIC PROCESSING DEVICE, INFORMATION PROCESSING APPARATUS, AND CONTROL METHOD OF THE ARITHMETIC PROCESSING DEVICE

(71) Applicant: FUJITSU LIMITED, Kawasaki (JP)

(72) Inventors: Takeshi Ishibashi, Kawasaki (JP); Tadatoshi Shindo, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/908,879

(22) Filed: Mar. 1, 2018

(65) Prior Publication Data
US 2018/0267926 A1 Sep. 20, 2018

(30) Foreign Application Priority Data
Mar. 16, 2017 (JP) .............................. JP2017-051465

(51) Int. Cl.
| | |
|---|---|
| G06F 15/76 | (2006.01) |
| G06F 15/173 | (2006.01) |
| G06F 13/16 | (2006.01) |
| G06F 13/24 | (2006.01) |
| G06F 15/80 | (2006.01) |

(52) U.S. Cl.
CPC .... *G06F 15/17375* (2013.01); *G06F 13/1605* (2013.01); *G06F 13/24* (2013.01); *G06F 15/76* (2013.01); *G06F 15/8015* (2013.01)

(58) Field of Classification Search
None
See application file for complete search history.

(56) References Cited

U.S. PATENT DOCUMENTS

| | | | |
|---|---|---|---|
| 5,179,715 A | 1/1993 | Andoh et al. | |
| 5,908,468 A * | 6/1999 | Hartmann | ........... G06F 15/8015 |
| | | | 710/316 |
| 6,266,797 B1 * | 7/2001 | Godfrey | .................. G06F 15/78 |
| | | | 710/10 |
| 2006/0112207 A1 | 5/2006 | Takenobu | |
| 2016/0266898 A1 | 9/2016 | Kitamura | |

FOREIGN PATENT DOCUMENTS

| | | |
|---|---|---|
| JP | 63-289666 A | 11/1988 |
| JP | 2002-335250 | 11/2002 |
| JP | 2003-046547 | 2/2003 |
| JP | 2006-154943 A | 6/2006 |
| JP | 2016-167726 A | 9/2016 |

OTHER PUBLICATIONS

Japanese Office Action dated Jan. 5, 2021 for corresponding Japanese Patent Application No. 2017-051465, with English Translation, 13 pages.
Japanese Office Action dated Jun. 1, 2021 for corresponding Japanese Patent Application No. 2017-051465, with English Translation, 6 pages.

* cited by examiner

*Primary Examiner* — Corey S Faherty
(74) *Attorney, Agent, or Firm* — Fujitsu Patent Center

(57) ABSTRACT

An arithmetic processing device includes arithmetic processing units configured to perform arithmetic processing; first routers connected to the plurality of arithmetic processing units, respectively; first buses connecting the plurality of first routers in a ring shape; and second buses connecting between one of the plurality of first routers and any one of the other first routers excluding the first routers directly connected through the first buses.

12 Claims, 14 Drawing Sheets

FIG.3

| TRANSMISSION SOURCE | DESTINATION | PACKET TRANSFER PATH | TRANSMISSION SOURCE | DESTINATION | PACKET TRANSFER PATH |
|---|---|---|---|---|---|
| CG0 | CG1 | RSTP0, B1, RSTP1 | CG3 | CG0 | RSTP3, B2, RSTP2, B3, RSTP0 |
| CG0 | CG2 | RSTP0, B3, RSTP2 | CG3 | CG1 | RSTP3, B4, RSTP1 |
| CG0 | CG3 | RSTP0, B1, RSTP1, B4, RSTP3 | CG3 | CG2 | RSTP3, B2, RSTP2 |
| CG0 | ICC | RSTP0, B3, RSTP2, B5, RSTP4 | CG3 | ICC | RSTP3, B6, RSTP4 |
| CG0 | INT | RSTP0, B7, RSTP5 | CG3 | INT | RSTP3, B4, RSTP1, B8, RSTP5 |
| CG1 | CG0 | RSTP1, B1, RSTP0 | ICC | CG0 | RSTP4, B5, RSTP2, B3, RSTP0 |
| CG1 | CG2 | RSTP1, B1, RSTP0, B3, RSTP2 | ICC | CG1 | RSTP4, B6, RSTP3, B4, RSTP1 |
| CG1 | CG3 | RSTP1, B4, RSTP3 | ICC | CG2 | RSTP4, B5, RSTP2 |
| CG1 | ICC | RSTP1, B4, RSTP3, B6, RSTP4 | ICC | CG3 | RSTP4, B6, RSTP3 |
| CG1 | INT | RSTP1, B8, RSTP5 | ICC | INT | RSTP4, B6, RSTP3, B4, RSTP1, B8, RSTP5 |
| CG2 | CG0 | RSTP2, B3, RSTP0 | INT | CG0 | RSTP5, B7, RSTP0 |
| CG2 | CG1 | RSTP2, B2, RSTP3, B4, RSTP1 | INT | CG1 | RSTP5, B8, RSTP1 |
| CG2 | CG3 | RSTP2, B2, RSTP3 | INT | CG2 | RSTP5, B7, RSTP0, B3, RSTP2 |
| CG2 | ICC | RSTP2, B5, RSTP4 | INT | CG3 | RSTP5, B8, RSTP1, B4, RSTP3 |
| CG2 | INT | RSTP2, B3, RSTP0, B7, RSTP5 | INT | ICC | RSTP5, B8, RSTP1, B4, RSTP3, B6, RSTP4 |

FIG.4
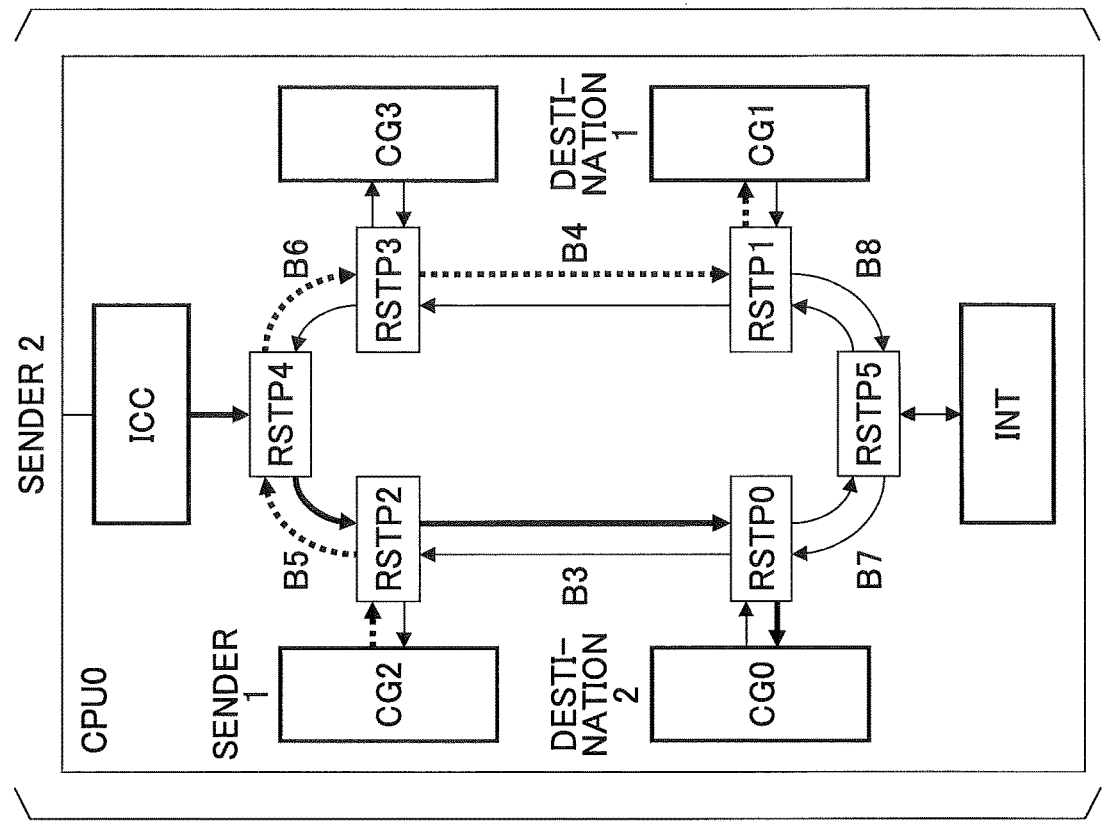
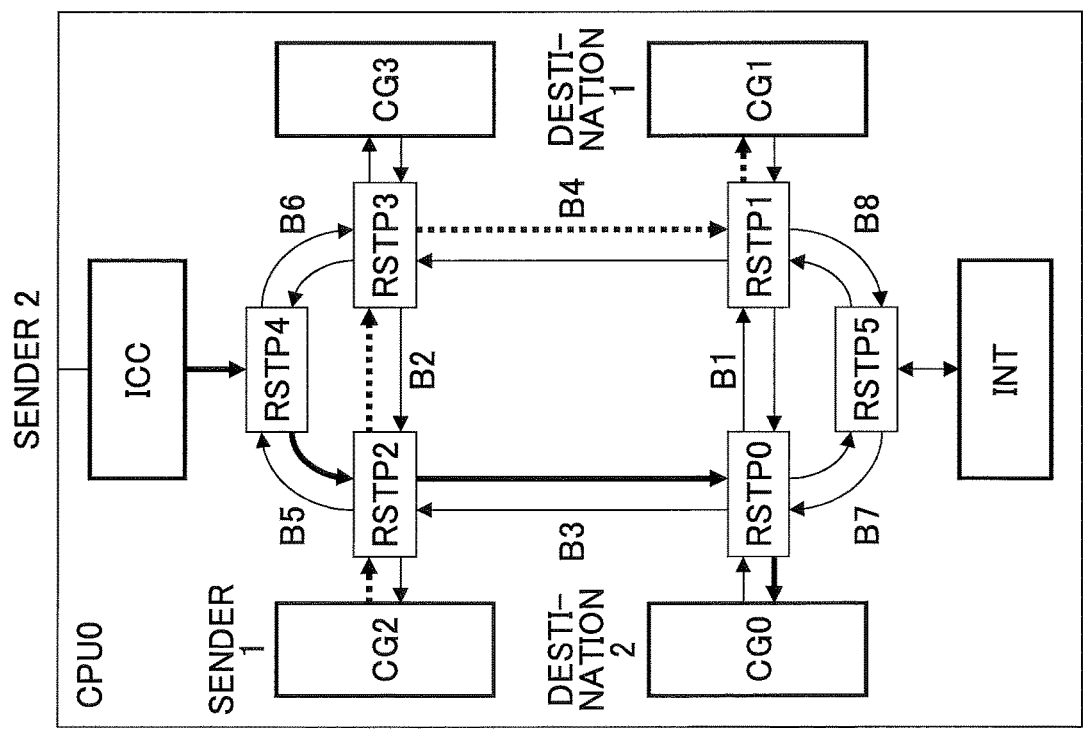

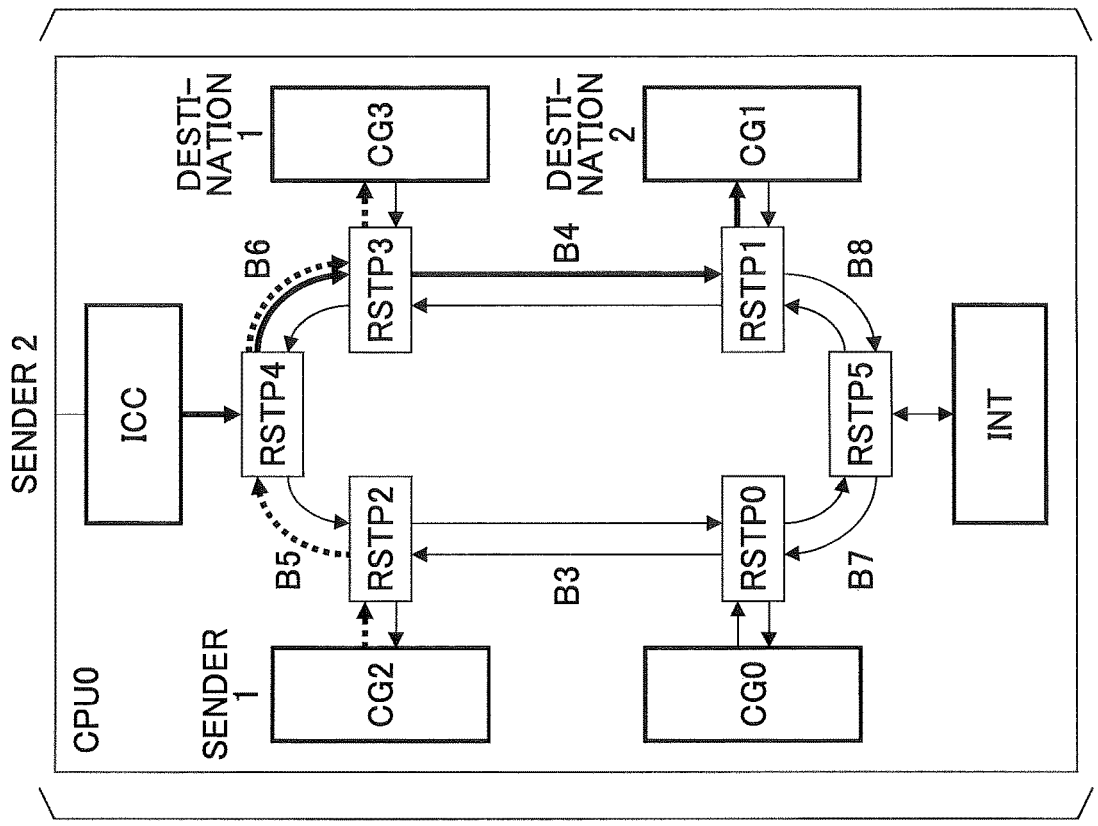
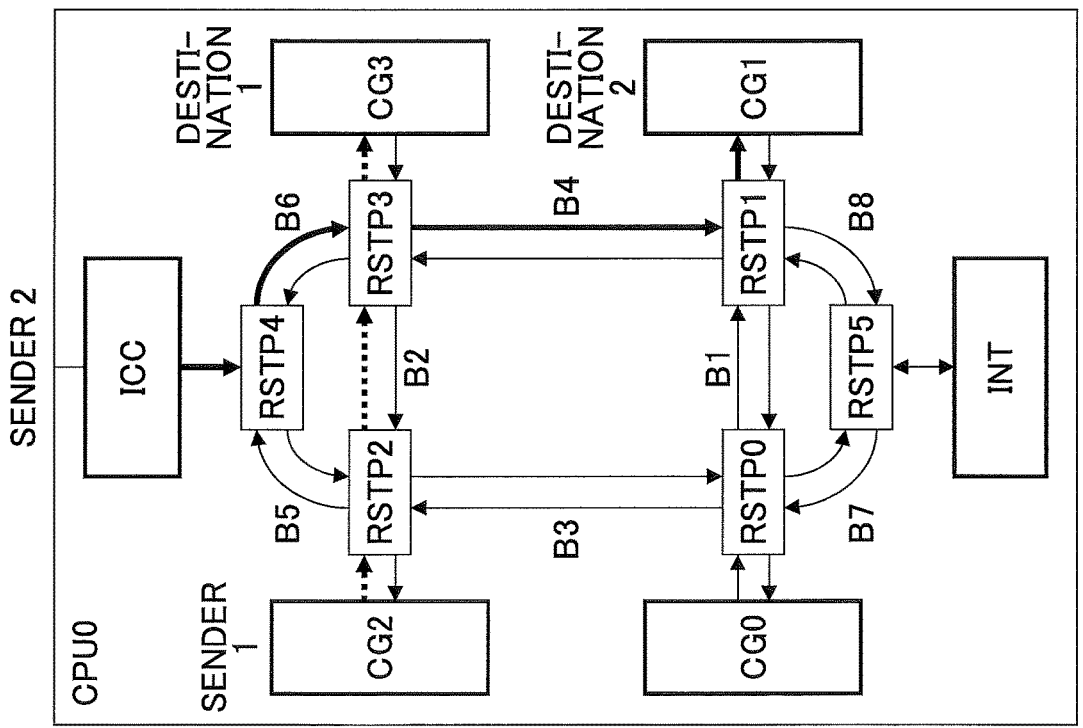
FIG.5

FIG.6
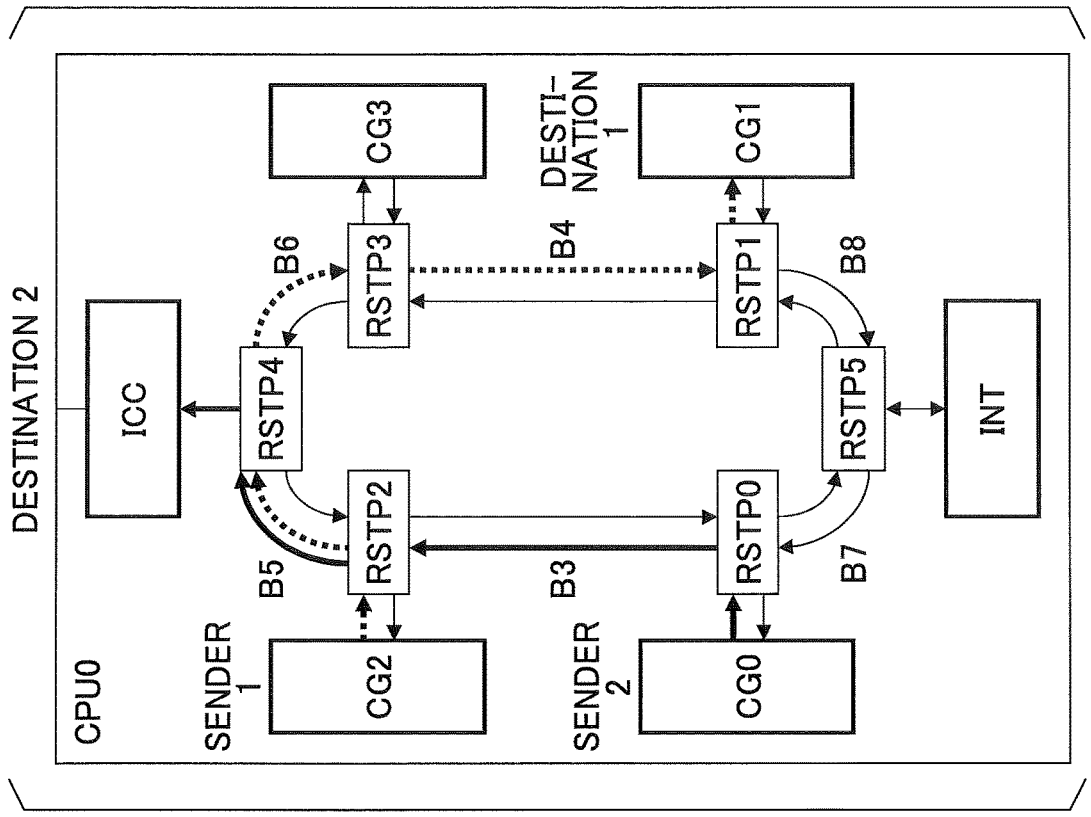
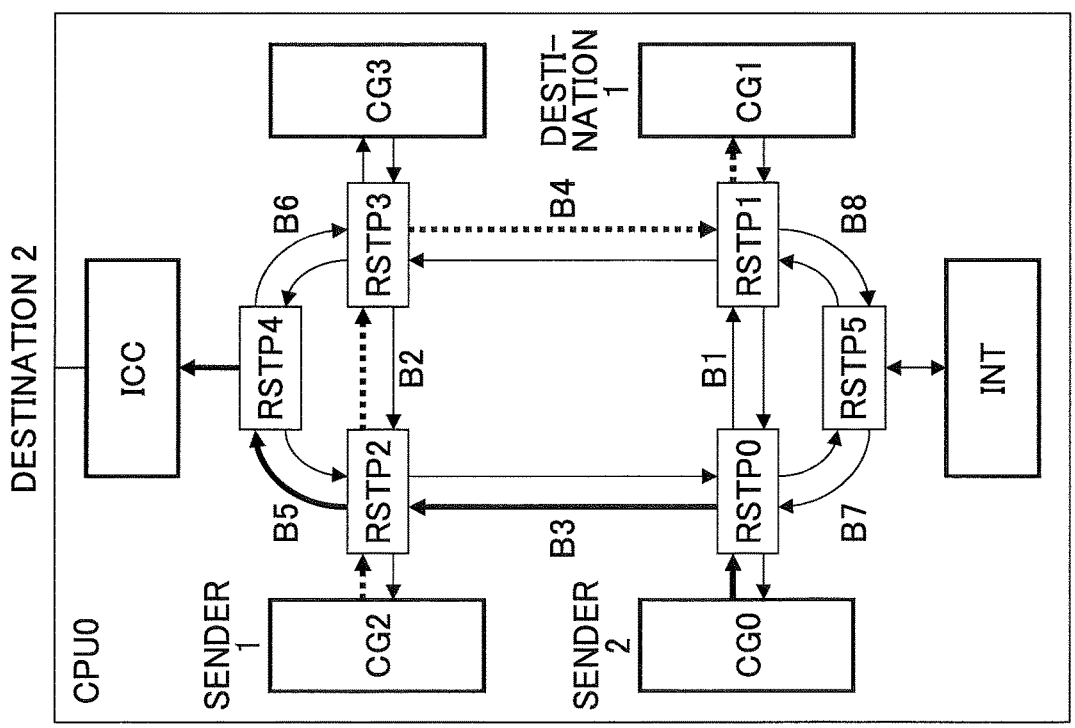

ARITHMETIC PROCESSING DEVICE, INFORMATION PROCESSING APPARATUS, AND CONTROL METHOD OF THE ARITHMETIC PROCESSING DEVICE

CROSS-REFERENCE TO RELATED APPLICATION

This application is based upon and claims the benefit of priority of the prior Japanese Patent Application No. 2017-51465, filed on Mar. 16, 2017, the entire contents of which are incorporated herein by reference.

FIELD

The disclosures discussed herein relate to an arithmetic processing device, an information processing apparatus, and a control method of the arithmetic processing device.

BACKGROUND

To communicate information such as data between multiple nodes each performing arithmetic processing, the nodes are mutually connected by a network having a topology such as a ring type, a connect type, a mesh type or the like. In order to reduce the number of wirings connected to the nodes compared to the mesh type network while ensuring the reliability and durability of communication, a technique of connecting nodes having high importance, among multiple nodes connected in a ring shape, to one another has been proposed (see, for example, Patent Document 1). Further, a technique has been proposed in which each of multiple relay apparatuses provided in a network distributes packet transmission paths by selecting a path for outputting a packet based on an address identifying a receiving apparatus included in the packet (See, for example, Patent Document 2).

RELATED ART DOCUMENT

Patent Documents

Patent Document 1: Japanese Laid-open Patent Publication No. 2002-335250
Patent Document 2: Japanese Laid-open Patent Publication No. 2003-46547

In a processor having multiple processor cores installed therein, a communication system called "network-on-chip" is known in the art. In this system, multiple processor cores (nodes) for performing arithmetic processing are connected to a network such as a ring type, and information is transmitted and received between the multiple processor cores via routers arranged on the network. The network-on-chip system improves communication performance of information as the number of nodes connected to each node increases; however, the chip size increases because the number of wires included in the network increases.

SUMMARY

Accordingly, it would be desirable to improve communication performance with minimal chip size increase.

According to one embodiment, an arithmetic processing device includes a plurality of arithmetic processing units configured to perform arithmetic processing; a plurality of first routers connected to the plurality of arithmetic processing units, respectively; first buses connecting the plurality of first routers in a ring shape; and second buses connecting between one of the plurality of first routers and any one of the other first routers excluding the first routers directly connected through the first buses.

According to another embodiment, a control method of an arithmetic processing device is provided. The arithmetic processing device includes a plurality of arithmetic processing units each performing arithmetic processing, a plurality of first routers connected to the plurality of arithmetic processing units, respectively, first buses connecting the plurality of first routers in a ring shape, and second buses connecting between one of the plurality of first routers and any one of the other first routers excluding the first routers directly connected through the first buses. The control method includes causing a pair of first routers connected to each other through the second bus, among the plurality of first routers, to output, to the first buses or the second buses, information pieces received from a pair of arithmetic processing units connected to the pair of first routers, among the plurality of arithmetic processing units, and to prevent, from being output to the second buses, information pieces received from arithmetic processing units other than the pair of arithmetic processing units.

The object and advantages of the invention will be realized and attained by means of the elements and combinations particularly pointed out in the appended claims.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIG. 3 is a diagram illustrating an example of a packet transfer path in CPU0 illustrated in FIG. 1;

FIG. 4 is a diagram illustrating an example of an operation in a case where communication between an interconnect controller and a core group and communication between core groups occur simultaneously in the CPU0 illustrated in FIG. 1;

FIG. 5 is a diagram illustrating another example of an operation in a case where communication between an interconnect controller and a core group and communication between core groups occur simultaneously in the CPU0 illustrated in FIG. 1;

FIG. 6 is a diagram illustrating an example of an operation in a case where a packet is issued from multiple core groups in the CPU0 illustrated in FIG. 1;

DESCRIPTION OF EMBODIMENTS

The following illustrates preferred embodiments with reference to the accompanying drawings.

Figure 1:
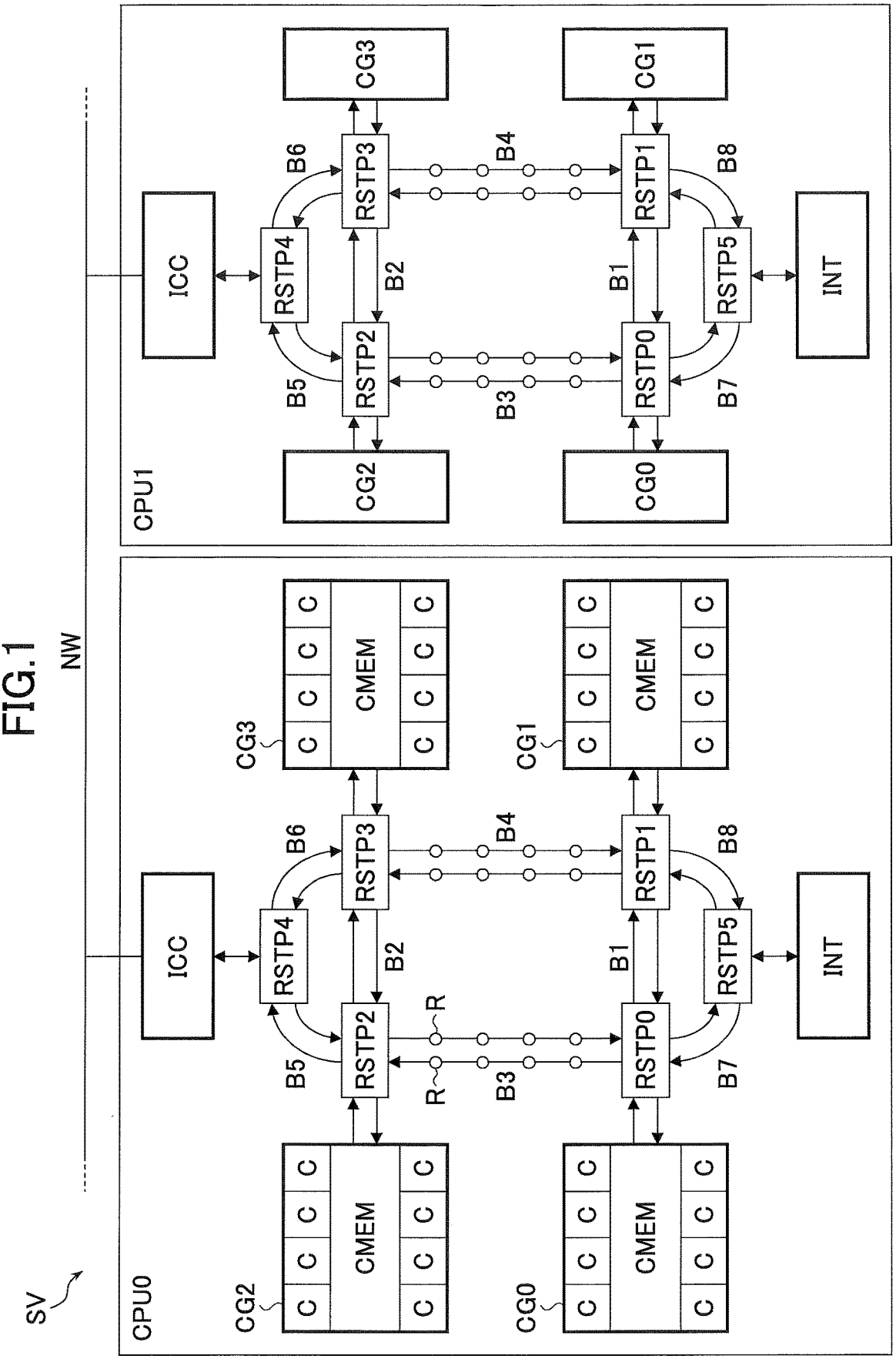
FIG. 1 is a diagram illustrating an embodiment of an arithmetic processing device, an information processing apparatus, and a control method of the arithmetic processing device.

FIG. 1 is a diagram illustrating an embodiment of an arithmetic processing device, an information processing apparatus, and a control method of the arithmetic processing device. An information processing apparatus SV illustrated in FIG. 1 is, for example, a parallel computer such as a supercomputer or a server used for HPC (High Performance Computing) that includes CPU0 and CPU1 (Central Processing Units) mutually connected via a network NW. The CPU0 and CPU1 each form a semiconductor chip. Since the CPU0 and CPU1 have the same configuration, the configuration of CPU0 will be described below. A network NW is an example of a transmission path, and the CPU0 and CPU1 are an example of an arithmetic processing device.

The CPU0 has four core groups CGs (CG0, CG1, CG2, and CG3), an interconnect controller ICC and an interrupt controller INT. Further, the CPU0 has ring stop RSTPs (RSTP0 to RSTP5) connected to the core groups CG0 to CG3, the interconnect controller ICC and the interrupt controller INT, respectively. The number of core groups CGs installed in each of CPU0 and CPU1 is not limited to four. The core group CG is an example of an arithmetic processing unit.

The digit at the end of the reference symbol of each core group CG is the same as the digit at the end of the reference symbol of the ring stop RSTP connected to the corresponding core group CG. In the following, each of the core groups CG and the ring stops RSTP corresponding to the core groups CG are also referred to as nodes. A ring stop RSTP4 is connected to the interconnect controller ICC, and a ring stop RSTP5 is connected to the interrupt controller INT. For example, information pieces input and output to each of the core groups CGs, the interconnect controller ICC, and the interrupt controller INT are communicated by a packet system.

The ring stops RSTP0 to RSTP3 respectively connected to the core groups CG0 to CG3 are examples of first routers. The ring stops RSTP4 and RSTP5 respectively connected to the interconnect controller ICC and the interrupt controller INT are examples of a second router.

The ring stops RSTP0 to RSTP5 function to arbitrate between packets received from multiple buses B (B0 to B8) to send the packet, selected by arbitration and directed toward the packet destination, to any one of the buses B (B0 to B8). In addition, the ring stops RSTP0 to RSTP3 respectively connected to the core groups CG0 to CG3 have a function of equitably arbitrating the packets issued by the core groups CGs of the other (ring stop) nodes and outputting the arbitrated packet to the core group CG of the corresponding node. The function of equitably arbitrating packets will be described later with reference to FIGS. 8 to 11.

Each core group CG has eight processor cores C and a cache memory CMEM shared by the eight processor cores C. The processor cores C each execute arithmetic processing by executing a program stored in a main storage device or the like (not illustrated). The cache memory CMEM stores instructions executed by the processor cores C and data used by the processor cores C for arithmetic processing. The number of processor cores C installed in each core group CG is not limited to eight. The interconnect controller ICC is connected to the network NW and controls communication with another CPU (CPU1 etc.) connected via the network NW. The interrupt controller INT controls interrupt processing based on an interrupt request from the core group CG or an interrupt request from the CPU1 or the like received via the interconnect controller ICC. The interconnect controller ICC and the interrupt controller INT are examples of a controller configured to control transfer of information input to or output from the core groups CG.

The CPU0 has buses B (B1 to B8) each connecting between the ring stops RSTP. Each of the buses B1 to B8 has a forward path and a return path independently, and a network-on-chip is constructed through the buses B1 to B8. In the example illustrated in FIG. 1, a ring network connecting the ring stops RSTP0, RSTP2, RSTP4, RSTP3, RSTP1, and RSTP5 in a ring shape is constructed through the buses B3, B5, B6, B4, B8, and B7. The buses B3, B5, B6, B4, B8, and B7 included in the ring network are examples of first buses. In the following description, the buses B3, B5, B6, B4, B8, and B7 may be referred to as a ring network in some cases.

The ring stops RSTP0 and RSTP1 are mutually connected through a bus B1 and the ring stops RSTP2 and RSTP3 are mutually connected through a bus B2. The bus B1 is a dedicated bus for transferring only packets issued by the core groups CG0 and CG1 and the bus B2 is a dedicated bus for transferring only packets issued by the core groups CG2 and CG3. In the following description, the buses B1 and B2 are also referred to as dedicated buses B1 and B2. The buses B1 and B2 are examples of second buses.

On the bus B1, a path from the ring stop RSTP0 to the ring stop RSTP1 (rightward arrow) is used only for transfer of packets issued by the core group CG0. On the bus B1, a path from the ring stop RSTP1 to the ring stop RSTP0 (leftward arrow) is used only for transfer of packets issued by the core group CG1. On the bus B2, a path from the ring stop RSTP2 to the ring stop RSTP3 (rightward arrow) is used only for transfer of packets issued by the core group CG2. On the bus B2, a path from the ring stop RSTP3 to the ring stop RSTP2 (leftward arrow) is used only for transfer of packets issued by the core group CG3.

Four registers R for relaying packets are arranged at predetermined intervals in each of the forward and return paths of the buses B3 and B4. Since the lengths of the buses B1, B2, B5, B6, B7, and B8 are shorter than arrangement intervals between the registers R, the registers R are not arranged in the buses B1, B2, B5, B6, B7, and B8. The number of the registers R arranged in each of the forward and return paths of the buses B3 and B4 is not limited to four.

For example, the bus B3 connecting between the ring stops RSTP0 and RSTP2 includes four registers R. Hence, transfer of a packet between ring stops RSTP0 and RSTP2 takes 5 clock cycles. By contrast, transfer of a packet between a pair of ring stop RSTPs connected to each of the buses B1, B2, B5, B6, B7, and B8 that do not include a register R takes one clock cycle only.

In the CPU0 illustrated in FIG. 1, a ring stop RSTP (any one of RSTP0 to RSPT3) connected to a core group CG transmits a packet received from the core group CG of the corresponding node to any one of the buses B according to the destination of the packet. The ring stop RSTP connected to the corresponding core group CG outputs the received packet to the core group CG of the corresponding node in response to the destination of the packet received from the bus B being the corresponding node. Each of the ring stops RSTP connected to the corresponding core group CG transmits the received packet to one of the buses B excluding the buses B1 and B2, according to the destination of the packet in response to the destination of the packet received from the bus B not being the corresponding node.

In response to the destination of the packet received from the bus B being any one of the core groups CG in the CPU0 or the interrupt controller INT, the ring stop RSTP4 outputs the received packet to any one of the buses B according to the destination of the packet. The ring stop RSTP4 outputs the received packet to the interconnect controller ICC in response to the destination of the packet received from the bus B being another CPU (CPU1 or the like).

In response to the destination of the packet received from the bus B being the interrupt controller INT, the ring stop RSTP5 outputs the received packet to the interrupt controller INT. In response to the destination of the packet received from the bus B or the interrupt controller INT being any one of the core groups CG in the CPU0 and the CPU1, the ring stop RSTP5 outputs the received packet to any one of the buses B according to the destination of the packet.

In the CPU0 (or the CPU1) illustrated in FIG. 1, in a case of the arithmetic processing (calculation processing, data processing) being capable of being performed by the processor cores C included in only one core group CG, the arithmetic processing is executed within one core group CG. In a case where arithmetic processing resources (calculation resources) are insufficient with the processor cores C in one core group CG, processor cores C in a core group CG of another node connected through the bus B1 (or B2) are also used to perform arithmetic processing. For example, in response to the arithmetic processing resources being insufficient with the core group CG0, arithmetic processing may be performed using the core groups CG0 and CG1. For example, in response to the arithmetic processing resources being insufficient with the core group CG2, arithmetic processing may be performed using the core groups CG2 and CG3.

Further, in response to the arithmetic processing resources being insufficient with the core groups CG0 and CG1 (or CG2 and CG3) of the CPU0, arithmetic processing is performed using three core groups CG or all the core groups CG0 to CG3. Furthermore, in response to the arithmetic processing resources being insufficient with the core groups CG0 to CG3 of the CPU0, the arithmetic processing is performed also using the core groups CG of another CPU1 in the information processing apparatus SV illustrated in FIG. 1.

For example, in a case of the processor cores C in the core group CG0 having insufficient arithmetic processing resources, and of thus also performing arithmetic processing using the core group CG1, transmission and reception of packets between the core groups CG0 and CG1 may be performed via the dedicated bus B1. Packets may be less likely to compete in the transmission and reception of packets via the dedicated bus as compared with transmission and reception of packets via the ring network. Therefore, packet communication performance and arithmetic processing performance may be improved as compared with the case of transferring packets between the core group CG0 and the core group CG2 or CG3 via the ring network. This makes it possible, for example, to improve ping pong latency performance, which is one of indicators of packet transmission/reception performance in HPC, to a desired value.

Further, the registers R are not arranged with respect to the buses B1 and B2. Hence, it is possible to reduce the clock cycles involved in transmission and reception of packets between the core groups CG0 and CG1, for example, compared with clock cycles involved in transmission and reception of packets between the core groups CG0 and CG2 via the bus B3. As a result, the performance of the arithmetic processing using the core groups CG0 and CG1 may be improved, for example, compared with the performance of the arithmetic processing using the core groups CG0 and CG2.

Similarly, in response to the processor cores C in the core group CG2 having insufficient arithmetic processing resources, the arithmetic processing is also performed using the core group CG3, which improves the processing performance as compared with a case of using the group CG2 and CG0 or the core groups CG2 and CG1.

The ring stop RSTP0 is connected via a bus B1 to a ring stop RSTP1, which has a shorter distance from the ring stop RSTP0, out of the ring stops RSTP1 and RSTP3 that are not directly connected thereto (i.e., the ring stop RSTP0) through the ring network. Note that "directly connected" indicates the absence of any routers therebetween. Thus, compared to a case where the ring stops RSTP0 and RSTP3 are connected via a dedicated bus, the number of the registers R arranged on the bus B1 may be reduced and the number of transfer cycles of packets transferred on the bus B1 may be reduced. Likewise, the ring stop RSTP2 is connected via a bus B2 to a ring stop RSTP3, which has a shorter distance from the ring stop RSTP2, out of the ring stops RSTP1 and RSTP3 that are not directly connected thereto (i.e., the ring stop RSTP2) through the ring network. Thus, compared to a case where the ring stops RSTP2 and RSTP1 are connected via a dedicated bus, the number of the registers R arranged on the bus B2 may be reduced and the number of transfer cycles of packets transferred on the bus B2 may be reduced.

In FIG. 1, a pair of ring stop RSTPs arranged on the ring network are connected through a dedicated bus B1 (or B2); however, a pair of ring stop RSTPs arranged on a mesh network may be connected through a dedicated bus. Alternatively, a pair of ring stop RSTPs arranged on a torus network may be connected through a dedicated bus.

Figure 2:
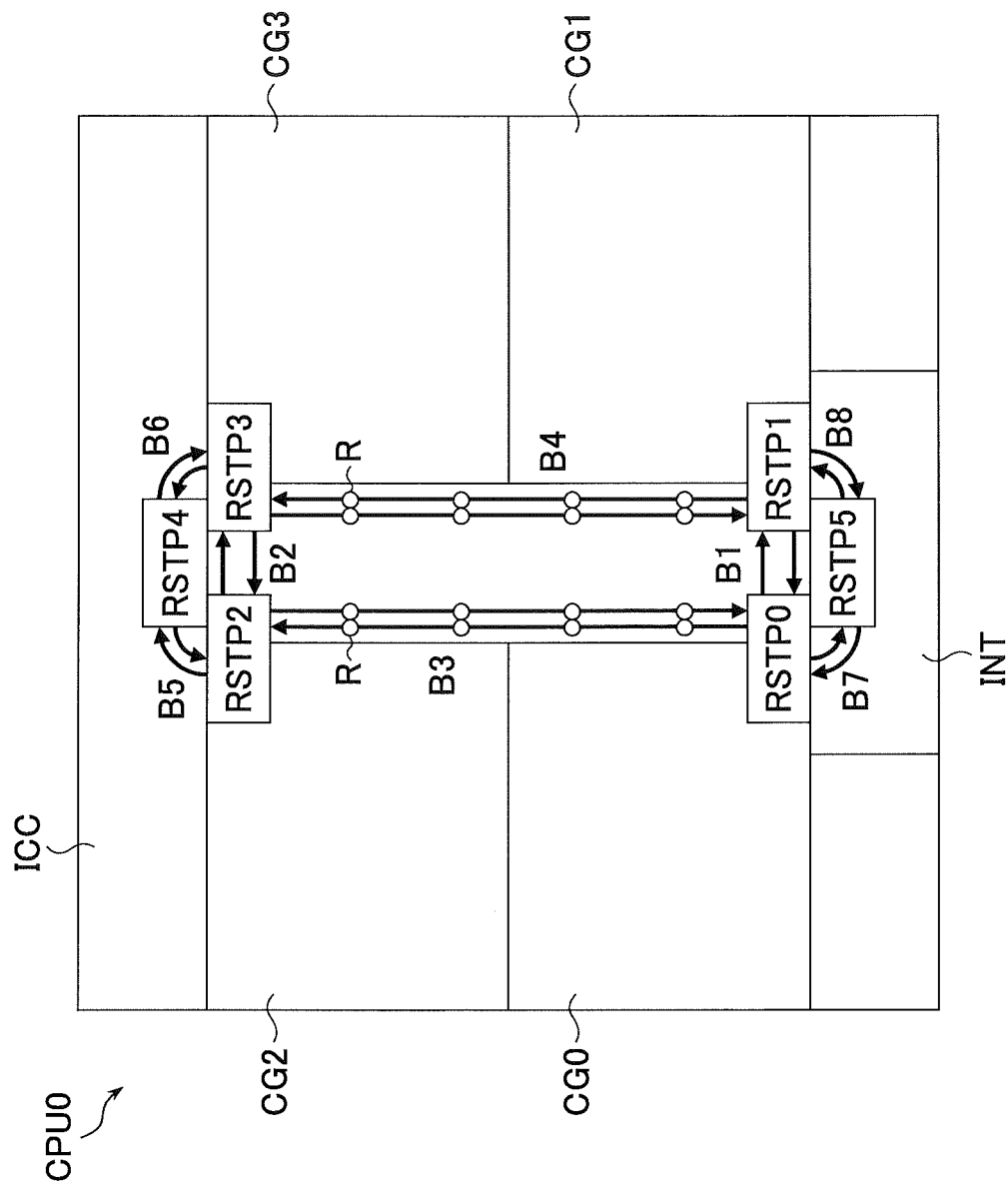
FIG. 2 is a diagram illustrating an overview of a chip layout of a CPU0 illustrated in FIG. 1.

FIG. 2 is a diagram illustrating an overview of a chip layout of a CPU0 illustrated in FIG. 1. The CPU1 illustrated in FIG. 1 also has the same chip layout as FIG. 2. In FIG. 2, the core group CG0 is arranged on the lower left side of a chip, the core group CG1 is arranged on the lower right side of the chip, the core group CG2 is arranged on the upper left side of the chip, and the core group CG3 is arranged on the upper right side of the chip. The ring stop RSTP0 is arranged on the lower right side of the core group CG0 and the ring stop RSTP1 is arranged on the lower left side of the core group CG1. The ring stop RSTP2 is arranged on the upper right side of the core group CG2 and the ring stop RSTP3 is arranged on the upper left side of the core group CG3.

The interconnect controller ICC is arranged on the upper side of the chip, and the ring stop RSTP4 is arranged at a position close to the ring stops RSTP2 and RSTP3 on the lower side of the interconnect controller ICC. The interrupt controller INT is arranged on the lower side of the chip, and the ring stop RSTP5 is arranged at a position close to the ring stops RSTP0 and RSTP1 on the upper side of the interrupt controller INT.

A ring network is constructed through the buses B3, B5, B6, B4, B8, and B7 in a center portion of the chip. In addition, ring stops RSTP0 and RSTP1 which are close to each other are mutually connected via a bus B1, and ring stops RSTP2 and RSTP3 which are close to each other are mutually connected via a bus B2.

The distance between the ring stops RSTP0 and RSTP1, the distance between the ring stops RSTP0 and RSTP5, and the distance between the ring stops RSTP5 and RSTP1 are shorter than each of the arrangement intervals of the registers R arranged on the buses B3 and B4. Similarly, the distance between the ring stops RSTP2 and RSTP3, the distance between the ring stops RSTP2 and RSTP4, and the distance between the ring stops RSTP4 and RSTP2 are shorter than each of the arrangement intervals of the registers R arranged on the buses B3 and B4. Hence, the registers R are not arranged on the buses B1, B7, B8, B2, B5, and B6.

In a case where a bus B such as a ring network is provided on a chip, a wiring area of the bus B is secured on the chip unlike a case where the boards are connected by cables. Accordingly, as the number of buses B increases, the chip size increases and the chip cost rises. In FIGS. 1 and 2, a ring stop RSTP is connected to any one of the other ring stop RSTPs via the dedicated bus B1 (or B2), without directly mutually connecting all the ring stops RSTP0 to RSTP3 that are connected to the core groups CG0 to CG3. As a result, the communication performance may be improved with a minimum chip size increase.

By contrast, for example, in a case of providing a bus B connecting between the ring stops RSTP1 and RSTP2, and a bus B connecting between the ring stops RSTP0 and RSTP3 respectively, in addition to the bus B illustrated in FIG. 2, a wiring area increases and the chip size increases, as compared with FIG. 2.

FIG. 3 is a diagram illustrating an example of a packet transfer path in CPU0 illustrated in FIG. 1. The packet transfer path is predetermined for each destination of a packet for each sender (transmission source) of a packet. Each of the ring stops RSTP0 to RSTP3 outputs a packet to the dedicated bus B1 or B2 when the destination of a packet received from the core group CG of the corresponding node is the core group CG that is opposite or diagonally across a ring network.

In the communication using the transfer path of the packet including the bus B1 or the bus B2 underlined, packet transfer latency may be reduced by adding the buses B1 and B2 to the ring network, as compared with a case of not adding the buses B1 and B2. That is, when a packet is transferred to a core group CG arranged at a position being opposite or diagonally across a ring network, it is possible to reduce the number of the ring stop RSTPs and the number of the buses B through which a packet passes, compared with a case without adding the buses B1 and B2.

Note that latency is indicated by the time from the issuance of a packet by a sender (transmission source) to the arrival of the packet to the destination. Alternatively, latency is indicated by the numbers of ring stops RSTP and registers R (number of hops) through which a packet passes. In FIG. 3, a packet transfer path including the bus B1 or B2 indicated by underlining is a transfer path for transferring a packet to a core group CG opposite or diagonal across a ring network.

For example, a packet that the core group CG0 issues to the core group CG1 (or CG3) is transferred to the dedicated bus B1 and a packet that the core group CG3 issues to the core group CG0 (or CG2) is transferred to the dedicated bus B2. That is, each of the ring stops RSTP0 to RSTP3 allows output to the dedicated bus B1 or B2 of a packet received from the core group CG of the corresponding node.

Each of the ring stops RSTP0 to RSTP3 outputs a packet to a ring network (one of B3 to B8) when the destination of the packet received from the core group CG of the corresponding node is not a core group CG that is opposite or diagonally across the ring network. Furthermore, each of the ring stops RSTP0 to RSTP3 outputs a packet to a ring network (any one of B3 to B8) when receiving a packet from a node other than the core group CG of the corresponding node.

For example, a packet that the core group CG0 issues to the core group CG2 is transferred to the bus B3, and a packet that the core group CG3 issues to the core group CG1 is transferred to the bus B4. Moreover, a packet issued by the interconnect controller ICC or the interrupt controller INT reaches the destination via the ring network. That is, each of the ring stops RSTP0 to RSTP3 prevents output to the dedicated bus B1 or B2 of a packet received from a node other than the corresponding node.

The ring stops RSTP0 to RSTP3 output only a packet issued by the corresponding node to the dedicated bus B1 (or B2), such that there is no packet on the dedicated bus B1 (or B2) competing with a packet issued by any other node. As a result, it is possible to improve the communication performance of packets between the core groups CG opposite to each other across the ring network, as compared with a case where packets issued by other nodes are transferred to the dedicated bus B1 (or B2). In other words, in a case where one core group CG has insufficient arithmetic processing resources, arithmetic processing is performed using a core group CG that is opposite across the ring network; this will improve the packet communication performance, as compared with a case of using another core group CG. As a result, processing performance may be improved.

FIG. 4 is a diagram illustrating an example of an operation in a case where communication between an interconnect controller and a core group and communication between core groups occur simultaneously in the CPU0 illustrated in FIG. 1. That is, FIG. 4 illustrates an example of a control method of the arithmetic processing device. The inside of brackets on the right side of FIG. 4 indicates an operation in a case where the buses B1 and B2 are not provided.

In FIG. 4, communication (thick broken line) from the core group CG2 to the core group CG1 and communication (thick solid line) from the interconnect controller ICC to the core group CG0 occur simultaneously. In a case of the bus B2 being provided, a packet issued by the core group CG2 reaches the core group CG1 from the ring stop RSTP2 through the bus B2, the ring stop RSTP3, the bus B4, and the ring stop RSTP1. By contrast, on the right side of FIG. 4, because a packet issued by the core group CG2 is transferred from the ring stop RSTP2 to the ring stop RSTP3 via the bus B5, the ring stop RSTP4 and the bus B6, the number of hops increases as compared with the number of hops on the left side of FIG. 4.

Furthermore, as the number of buses B through which a packet passes and the number of ring stops RSTP through which a packet passes increase, the possibility of the passing packets competing with other packets increases. For example, on the right side of FIG. 4, in a case where a packet issued from the core group CG2 competes with another packet at the ring stop RSTP4, the output of the packet to the bus B6 is delayed, as compared with a case where a packet does not compete with another packet at the ring stop RSTP4.

FIG. 5 is a diagram illustrating another example of an operation in a case where communication between an interconnect controller and a core group and communication between core groups occur simultaneously in the CPU0 illustrated in FIG. 1. That is, FIG. 5 illustrates an example of a control method of the arithmetic processing device. The inside of brackets on the right side of FIG. 5 indicates an operation in a case where the buses B1 and B2 are not provided.

In FIG. 5, communication (thick broken line) from the core group CG2 to the core group CG3 and communication (thick solid line) from the interconnect controller ICC to the core group CG1 occur simultaneously. In a case of the bus B2 being provided, a packet issued by the core group CG2 reaches the core group CG3 from the ring stop RSTP2 through the bus B2, and the ring stop RSTP3. By contrast, on the right side of FIG. 5, a packet issued by the core group CG2 is transferred to the ring stop RSTP3 via the same route as the route illustrated on the right side of FIG. 4. As a result, the number of hops increases, as compared with the number of hops on the left side of FIG. 5. Further, on the right side of FIG. 5, similar to the route illustrated on the right side of FIG. 4, as the number of the buses B through which a packet passes and the number of the ring stops RSTP through which a packet passes increase, the possibility of the passing packets competing with other packets will increase. For example, in a case where a packet issued from the core group CG2 competes with a packet issued from the interconnect controller ICC at the ring stop RSTP4, latency until the packet reaches the core group CG3 may become larger than in a case on the left side of FIG. 5.

FIG. 6 is a diagram illustrating an example of an operation in a case where a packet is issued from multiple core groups in the CPU0 illustrated in FIG. 1. That is, FIG. 6 illustrates an example of a control method of the arithmetic processing device. The inside of brackets on the right side of FIG. 6 indicates an operation in a case where the buses B1 and B2 are not provided.

In FIG. 6, communication (thick broken line) from the core group CG2 to the core group CG1 and communication (thick solid line) from the core group CG0 to the interconnect controller ICC occur simultaneously. In a case of the bus B2 being provided, a packet issued by the core group CG2 reaches the core group CG3 through the bus B2, similar to the case of FIG. 4. By contrast, on the right side of FIG. 6, a packet issued by the core group CG2 is transferred to the ring stop RSTP3 via the same route as the route illustrated on the right side of FIG. 4. As a result, the number of hops increases, as compared with the number of hops on the left side of FIG. 6. Further, on the right side of FIG. 6, in a case where a packet issued by the core group CG2 competes with a packet issued by the core group CG0 at the ring stop RSTP2, latency until the packet reaches the core group CG1 will be larger than a case on the left side of FIG. 6.

Figure 7:
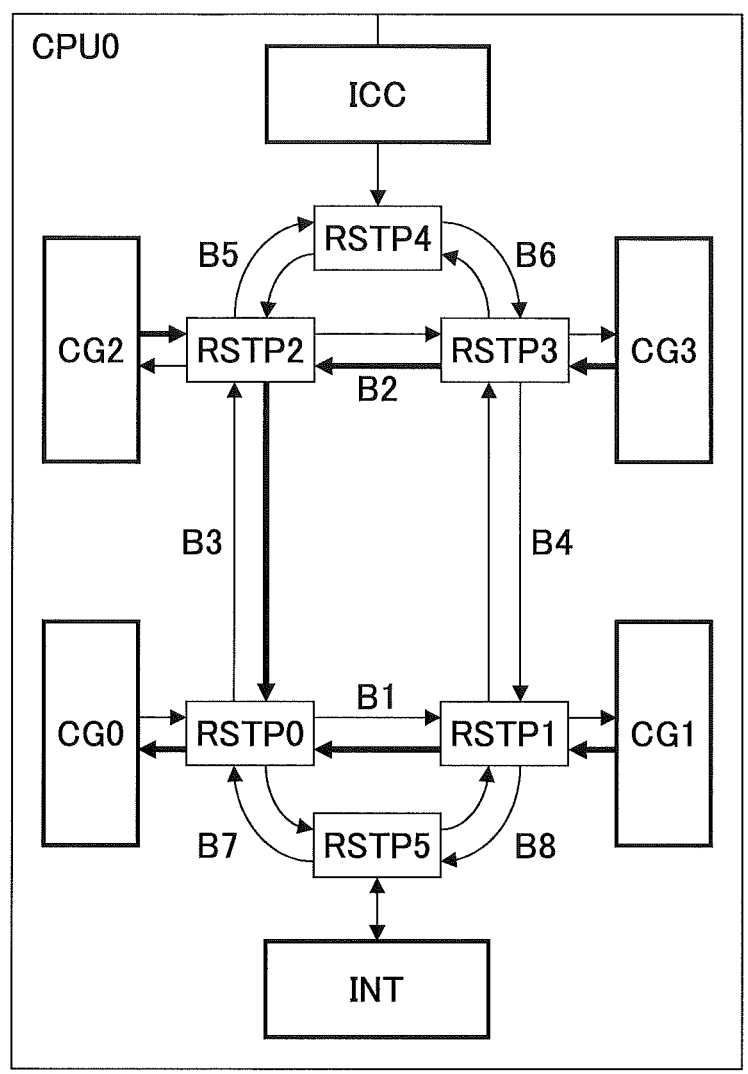
FIG. 7 is a diagram illustrating an example of an operation in a case where communications to the same destination occur simultaneously in the CPU0 illustrated in FIG. 1.

FIG. 7 is a diagram illustrating an example of an operation in a case where communications to the same destination occur simultaneously in the CPU0 illustrated in FIG. 1. That is, FIG. 7 illustrates an example of a control method of the arithmetic processing device. In FIG. 7, communications from the core groups CG1, CG2, CG3 to the core group CG0 occur at the same time. The packet issued by the core group CG1 reaches the core group CG0 via the ring stop RSTP1, the bus B1, and the ring stop RSTP0. The packet issued by the core group CG2 reaches the core group CG0 via the ring stop RSTP2, the bus B3, and the ring stop RSTP0. The packet issued by the core group CG3 reaches the core group CG0 via the ring stop RSTP3, the bus B2, the ring stop RSTP2, the bus B3 and the ring stop RSTP0.

The ring stop RSTP2 arbitrates between packets issued by the core groups CG2 and CG3, and the ring stop RSTP0 further arbitrates between the packets arbitrated by the ring stop RSTP2 and a packet issued by the core group CG1.

Figure 8:
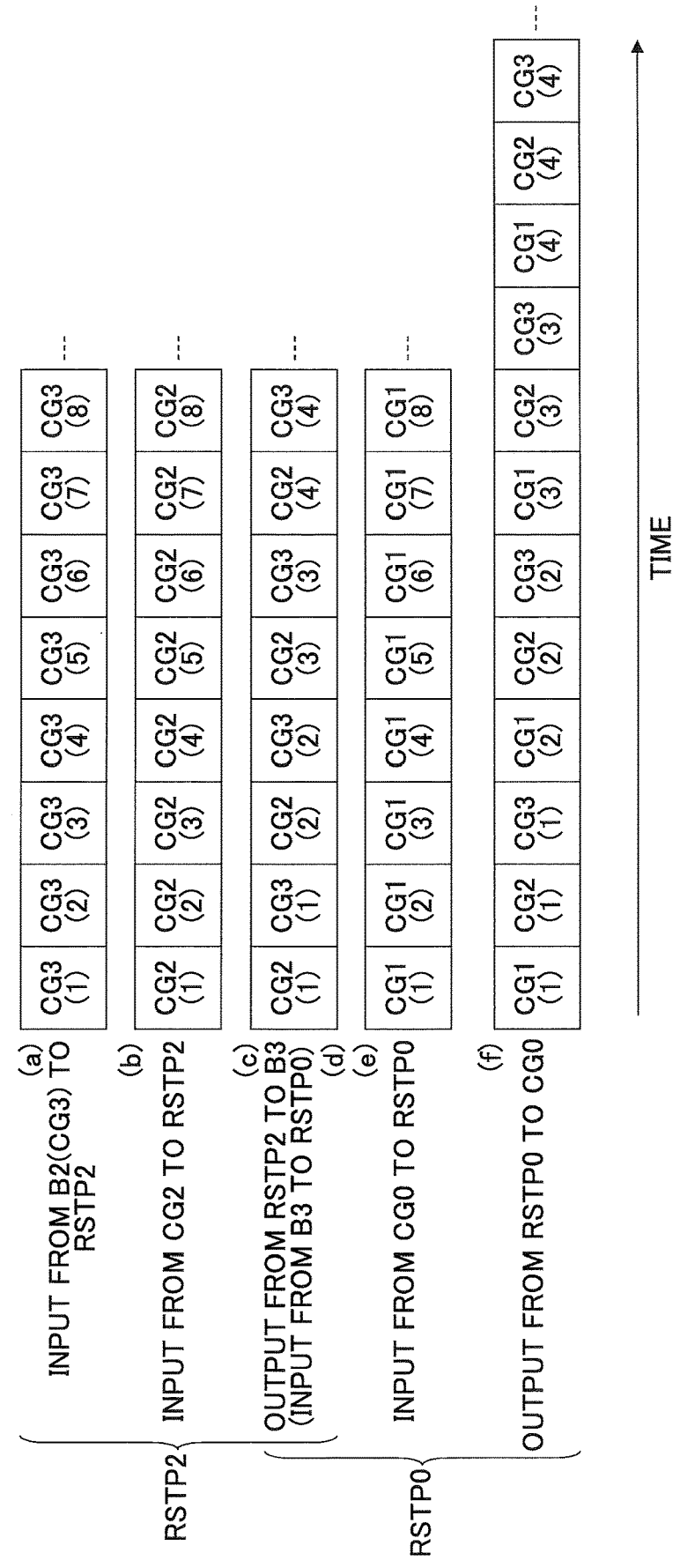
FIG. 8 is a diagram illustrating examples of arbitration operations of ring stops RSTP0 and RSTP2 in a case where an operation illustrated in FIG. 7 is repeated.

FIG. 8 is a diagram illustrating an example of an arbitration operation of ring stops RSTP2 and RSTP0 in a case where the operation illustrated in FIG. 7 is repeated. That is, FIG. 8 illustrates an example of a control method of the arithmetic processing device. FIG. 8 illustrates an example of an operation in a case of performing equitability control for maintaining equitability of arbitration between packets that are in competition. In FIG. 8, rectangles indicate packets issued by the core groups CG1, CG2, and CG3, and numerals in parentheses in the rectangles indicate the order of generation of packets in the respective core groups CG1, CG2, and CG3.

The ring stop RSTP2 sequentially receives packets from the core group CG3 via the bus B2 and sequentially receives packets from the core group CG2 of the corresponding node (see (a) and (b) in FIG. 8). The ring stop RSTP2 alternately selects a packet from the core group CG2 and a packet from the core group CG3, and outputs each of the selected packets to the bus B3 (see (c) in FIG. 8). In this case, the ring stop RSTP2 adds to a packet, transmission source information (CG3 or CG2) indicating a transmission source of a packet and outputs the packet to the bus B3. The packet transferred from the ring stop RSTP2 is supplied to the ring stop RSTP0 via the bus B3 (see (d) in FIG. 8).

Meanwhile, the ring stop RSTP0 sequentially receives packets from the core group CG0 of the corresponding node (see (e) in FIG. 8). The ring stop RSTP0 arbitrates between packets from the core groups CG2 and CG3 received from the bus B3 and packets from the core group CG1 received from the bus B1. In this case, the ring stop RSTP0 performs arbitration operation such that the ratios of the number of packets reaching the core group CG0 from the core groups CG1 to CG3 are equal to one another, based on the transmission source information added to the packet received from the bus B3 (see (f) in FIG. 8). That is, the ring stop RSTP0 more equally selects packets from the core groups CG1 to CG3 by arbitration in a case where the packets issued to the core group CG0 from the core groups CG1 to CG3 compete. As a result, the ratio of packets arriving from the core groups CG1, CG2, and CG3 to the core group CG0 respectively becomes 1:1:1, making it possible to maintain equitability of arbitration between packets when the packets are in competition.

The equitability of arbitration in packet competition occurring in the CPU0 is important, for example, in order to satisfy MPI (Message Passing Interface) performance, which is one of performance indicators in HPC. The operation of the ring stop RSTP0 illustrated in FIG. 8 may enable the implementation of the CPU0 satisfying desired MPI performance. The function of the ring stop RSTP0 illustrated in FIG. 8 is also installed in the other ring stops RSTP1, RSTP2, and RSTP3. In such a case, when packets transferred from the three core groups CG to the remaining core group CG are in competition, the equitability of arbitration between competing packets is maintained by the ring stops RSTP0 to RSTP3.

Figure 9:
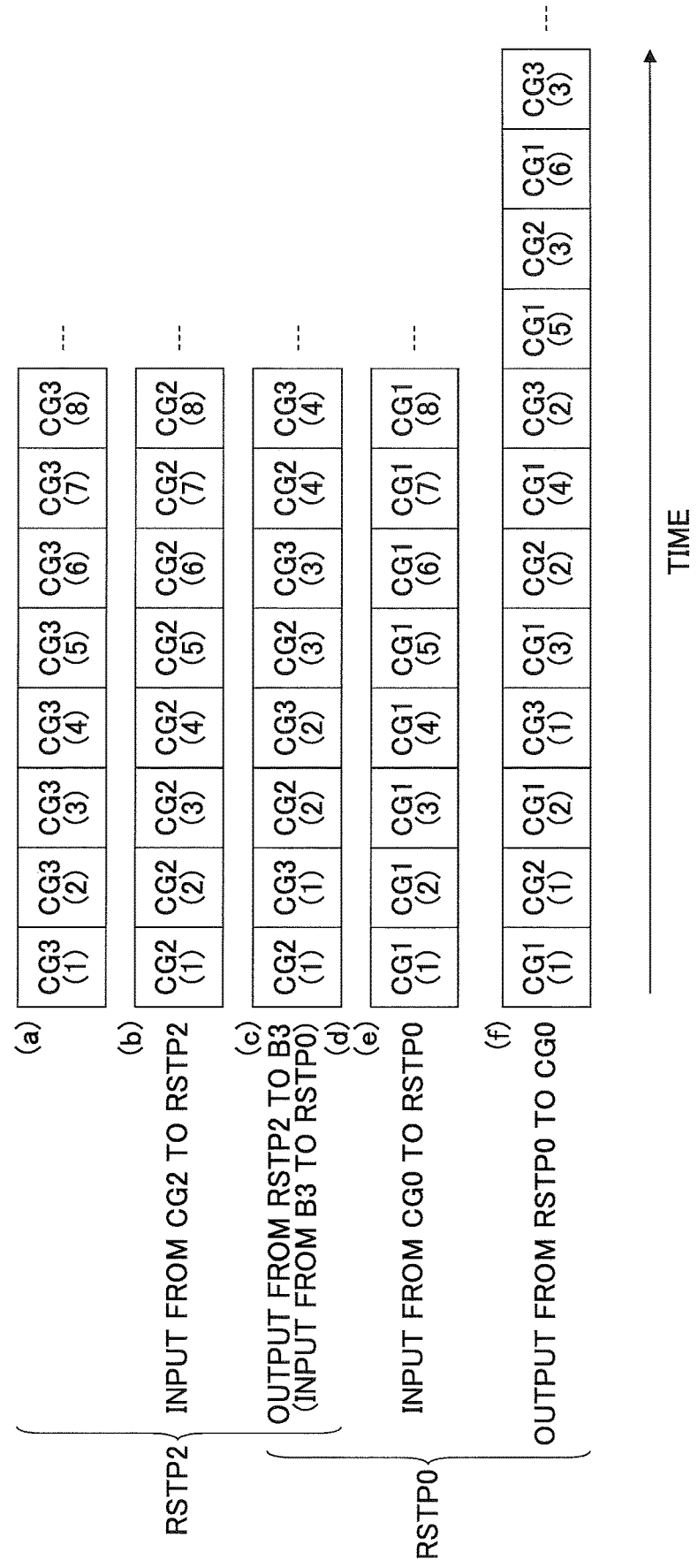
FIG. 9 is a diagram illustrating other examples of arbitration operations of ring stops RSTP0 and RSTP2 in a case where an operation illustrated in FIG. 7 is repeated.

FIG. 9 is a diagram illustrating another example of an arbitration operation of ring stops RSTP2 and RSTP0 in a case of repeating the operation illustrated in FIG. 7. A detailed description of the same operation as in FIG. 8 will be omitted. FIG. 9 is a diagram illustrating an example of an operation in a case where arbitration equitability control is not performed. Operations from (a) to (e) in FIG. 9 are the same as the operations from (a) to (e) in FIG. 8.

In (f) of FIG. 9, the ring stop RSTP0 arbitrates between packets from the core groups CG2 and CG3 received from the bus B3 and packets from the core group CG1 received from the bus B1. For example, the ring stop RSTP0 alternately selects a packet received from the bus B3 and a packet received from the bus B1 by an arbitration operation. As a result, the ratio of packets respectively arriving at the core group CG0 from the core groups CG1, CG2, and CG3 becomes 2:1:1, failing to maintain equitability of packet arbitration in a case where packet competition arises.

Figure 10:
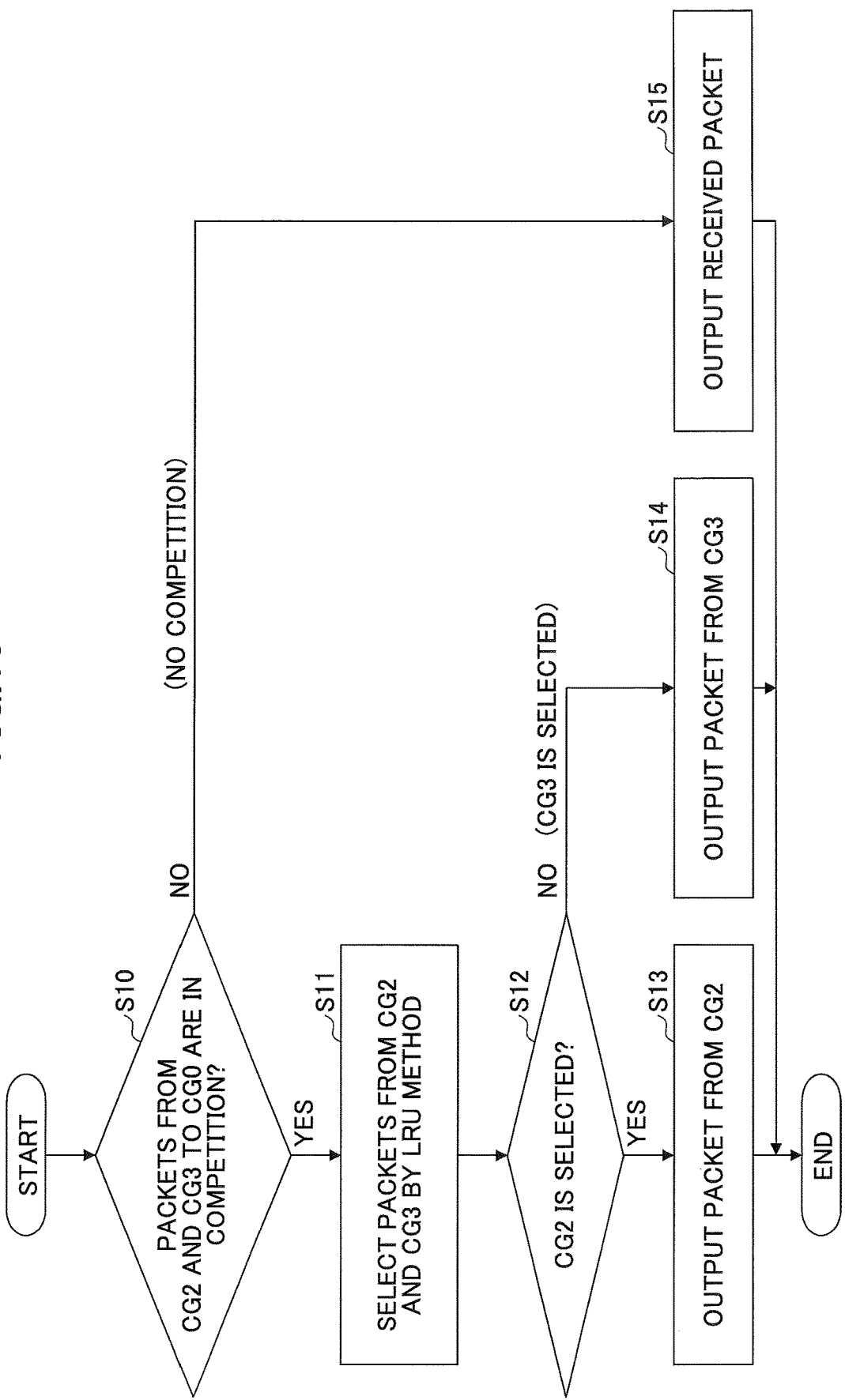
FIG. 10 is a flowchart illustrating an example of an operation of a ring stop RSTP2 that arbitrates between packets from core groups CG2 and CG3.

FIG. 10 is a flowchart illustrating an example of an operation of a ring stop RSTP2 that arbitrates between packets from core groups CG2 and CG3. That is, FIG. 10 illustrates an example of a control method of the arithmetic processing device. The flowchart illustrated in FIG. 10 is started when the ring stop RSTP2 receives a packet.

First, in step S10, the ring stop RSTP2 determines whether or not packets from the core groups CG2 and CG3 addressed to the core group CG0 are in competition. When the packets from the core groups CG2 and CG3 are in competition, a process proceeds to step S11; when the packets from the core groups CG2 and CG3 are not in competition, the process proceeds to step S15.

In step S11, the ring stop RSTP2 selects a packet from the core group CG2 when the previous transmission time of a packet from the core group CG2 is earlier than the previous transmission time of a packet from the core group CG3. By contrast, the ring stop RSTP2 selects a packet from the core group CG3 when the previous transmission time of a packet from the core group CG2 is later than the previous transmission time of a packet from the core group CG3. That is, the ring stop RSTP2 selects a packet to be transmitted to the core group CG0 by the LRU (Least Recently Used) method.

Next, in step S12, when the ring stop RSTP2 selects a packet from the core group CG2, a process proceeds to step S13, and when the ring stop RSTP2 selects a packet from core group CG3, the process proceeds to step S14.

In step S13, the ring stop RSTP2 outputs a packet from the core group CG2 selected by arbitration to the bus B3, and ends the process. In step S14, the ring stop RSTP2 outputs a packet from the core group CG3 selected by arbitration to the bus B3, and ends the process. In step S15, since no packets are in competition, the ring stop RSTP2 outputs the received packet to the bus B3, and ends the process.

Figure 11:
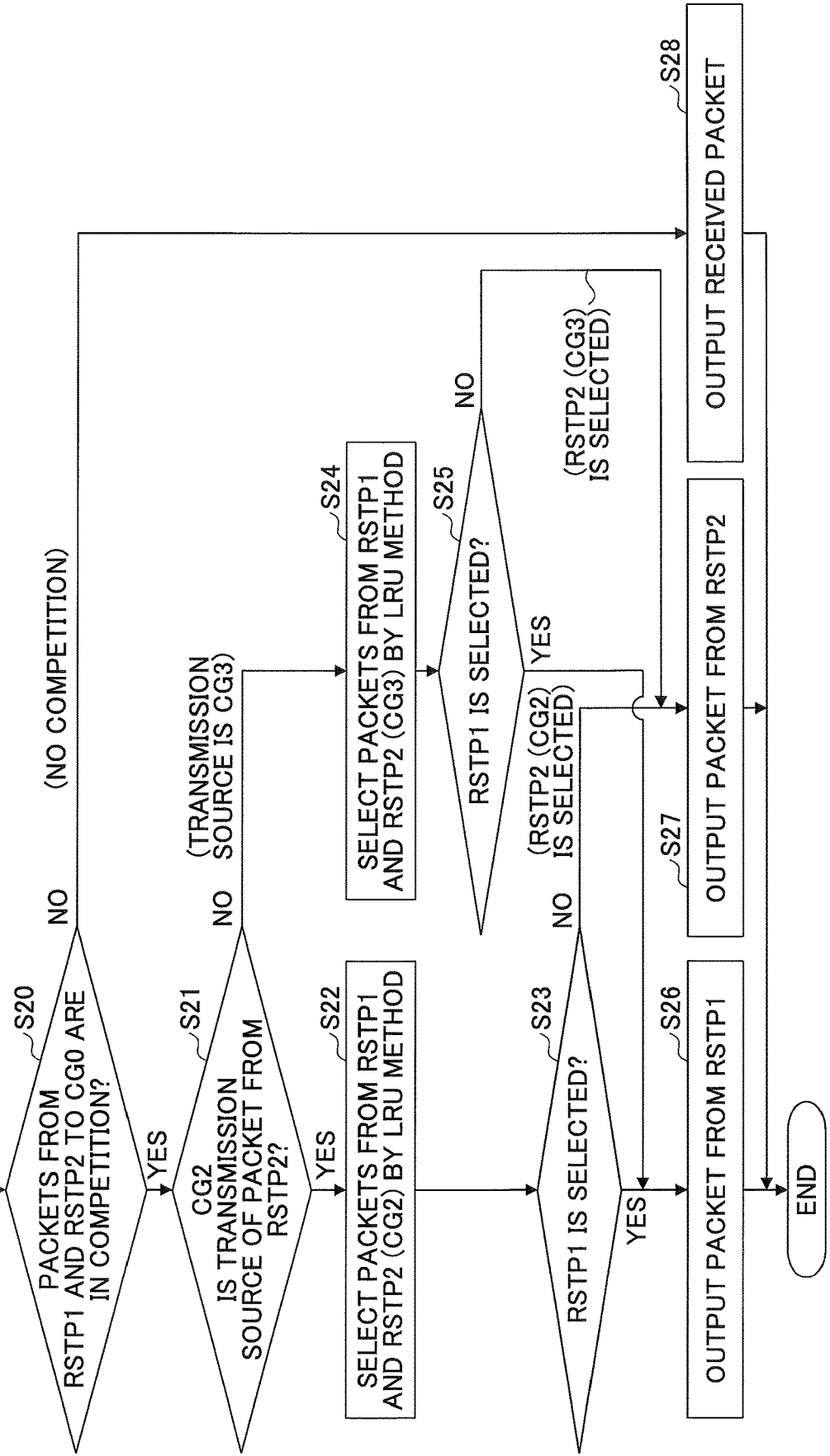
FIG. 11 is a flowchart illustrating an example of an operation of a ring stop RSTP0 that arbitrates between packets from core groups CG1, CG2 and CG3.

FIG. 11 is a flowchart illustrating an example of an operation of a ring stop RSTP0 that arbitrates between packets from core groups CG1, CG2 and CG3. That is, FIG. 11 illustrates an example of a control method of the arithmetic processing device. FIG. 11 illustrates an example of an operation in a case of performing equitability control for maintaining equitability of arbitration between packets when the packets are in competition. The flowchart illustrated in FIG. 11 is started when the ring stop RSTP0 receives a packet.

First, in step S20, the ring stop RSTP0 determines whether or not packets from the ring stops RSTP1 and RSTP2 addressed to the core group CG0 are in competition. When the packets from the ring stops RSTP1 and RSTP2 are in competition, a process proceeds to step S21; when the packets from the ring stops RSTP1 and RSTP2 are not in competition, the process proceeds to step S28.

In step S21, the ring stop RSTP0 identifies one of the core groups CG2 and CG3 as the transmission source of the packet from the ring stop RSTP2. When the ring stop RSTP0 identifies the core group CG2 as the transmission source of the packet from the ring stop RSTP2, the process proceeds to step S22; when the ring stop RSTP0 identifies the core group CG3 as the transmission source of the packet from the ring stop RSTP2, the process proceeds to step S24.

When packets are transferred from the core groups CG2 and CG3 to the core group CG0 and the packets addressed to core group CG0 issued by the core groups CG2 and CG3 compete, the ring stop RSTP2 selects any one of the packets by arbitration and outputs the selected packet to the bus B3. In the following description, "(CG2)" noted after the ring stop RSTP2 indicates the core group CG2 selected by the ring stop RSTP2 through arbitration. Likewise, "(CG3)" noted after the ring stop RSTP2 indicates the core group CG3 selected by the ring stop RSTP2 through arbitration.

In step S22, the ring stop RSTP0 selects a packet from the ring stop RSTP1 when the previous transmission time of a packet from the ring stop RSTP1 is earlier than the previous transmission time of a packet from the ring stop RSTP2 (CG2). The ring stop RSTP0 selects a packet from the ring stop RSTP2 (CG2) when the previous transmission time of a packet from the ring stop RSTP1 is later than the previous transmission time of a packet from the ring stop RSTP2 (CG2). That is, the ring stop RSTP0 selects a packet to be transmitted to the core group CG0 by the LRU (Least Recently Used) method.

Next, in step S23, when the ring stop RSTP0 selects a packet from the ring stop RSTP1, the process proceeds to step S26. When the ring stop RSTP0 selects a packet from the ring stop RSTP2 (CG2), the process proceeds to step S27.

In step S24, the ring stop RSTP0 selects a packet from the ring stop RSTP1 when the previous transmission time of a packet from the ring stop RSTP1 is earlier than the previous transmission time of a packet from the ring stop RSTP2 (CG3). The ring stop RSTP0 selects a packet from the ring stop RSTP2 (CG3) when the previous transmission time of a packet from the ring stop RSTP1 is later than the previous transmission time of a packet from the ring stop RSTP2 (CG3). That is, the ring stop RSTP0 selects a packet to be transmitted to the core group CG0 by the LRU (Least Recently Used) method.

Next, in step S25, when the ring stop RSTP0 selects a packet from the ring stop RSTP1, the process proceeds to step S26. When the ring stop RSTP0 selects a packet from the ring stop RSTP2 (CG3), the process proceeds to step S27.

In step S26, the ring stop RSTP0 outputs a packet from the ring stop RSTP1 selected by arbitration to the core group CG0, and ends the process. In step S27, the ring stop RSTP0 outputs a packet from the ring stop RSTP2 (CG2 or CG3) selected by arbitration to the core group CG0, and ends the process. In step S28, since no packets are in competition, the ring stop RSTP0 outputs the received packet to the core group CG0, and ends the process. FIG. 8 is a diagram illustrating an example of an arbitration operation when arbitration between packets from the core groups CG1, CG2, and CG3 is conducted by following the flowcharts of FIG. 10 and FIG. 11.

Figure 12:
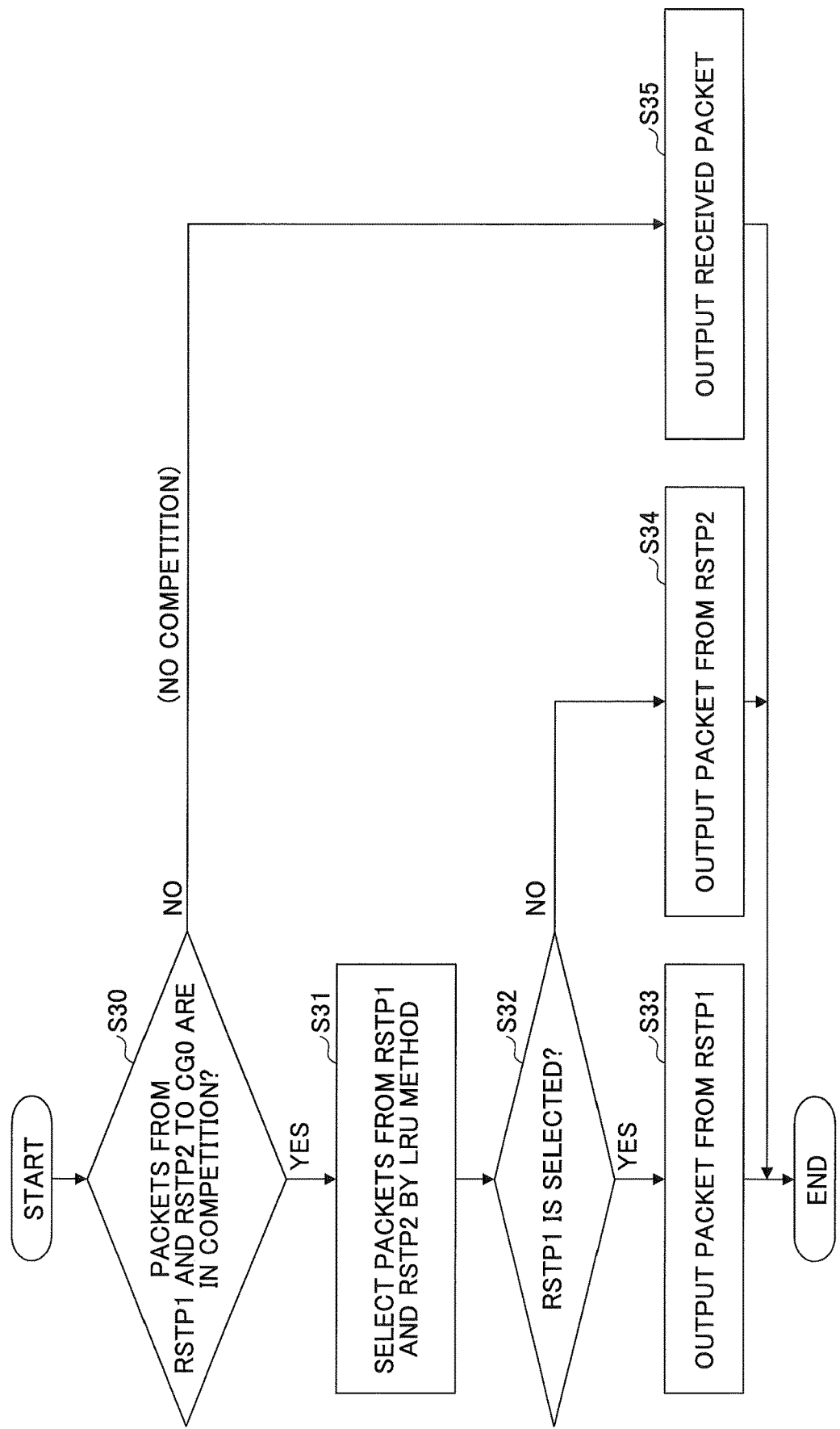
FIG. 12 is a flowchart illustrating another example of an operation of a ring stop RSTP0 that arbitrates between packets from core groups CG1, CG2 and CG3.

FIG. 12 is a flowchart illustrating another example of an operation of a ring stop RSTP0 that arbitrates between packets from the core groups CG1, CG2 and CG3. FIG. 12 is a flowchart illustrating an example of an operation in a case of not performing equitability control for maintaining equitability of arbitration between packets.

First, in step S30, the ring stop RSTP0 determines whether or not packets from the ring stops RSTP1 and RSTP2 addressed to the core group CG0 are in competition. When the packets from the ring stops RSTP1 and RSTP2 are in competition, a process proceeds to step S31. When the packets from the ring stops RSTP1 and RSTP2 are not in competition, the process proceeds to step S35.

In step S31, the ring stop RSTP0 selects a packet from the ring stop RSTP1 when the previous transmission time of a packet from the ring stop RSTP1 is earlier than the previous transmission time of a packet from the ring stop RSTP2. The ring stop RSTP0 selects a packet from the ring stop RSTP2 when the previous transmission time of a packet from the ring stop RSTP1 is later than the previous transmission time of a packet from the ring stop RSTP2. That is, the ring stop RSTP0 selects a packet to be transmitted to the core group CG0 by the LRU (Least Recently Used) method. In step S31, unlike steps S22 and S24 illustrated in FIG. 11, the ring stop RSTP0 selects a packet from the core groups CG2 and CG3, as a packet from the ring stop RSTP2, by the LRU method.

Next, in step S32, when the ring stop RSTP0 selects a packet from the ring stop RSTP1, the process proceeds to step S33. When the ring stop RSTP0 selects a packet from the ring stop RSTP2, the process proceeds to step S34.

In step S33, the ring stop RSTP0 outputs a packet from the ring stop RSTP1 selected by arbitration to the core group CG0, and ends the process. In step S34, the ring stop RSTP0 outputs a packet from the ring stop RSTP1 selected by arbitration to the core group CG0, and ends the process. In step S35, since no packets are in competition, the ring stop RSTP0 outputs the received packet to the core group CG0, and ends the process. FIG. 9 is a diagram illustrating an example of an arbitration operation when arbitration between packets from the core groups CG1, CG2, and CG3 is conducted by following the flowcharts of FIG. 10 and FIG. 12.

As described above, in the embodiments illustrated in FIGS. 1 to 12, among the ring stop RSTPs connected to the core groups CG, a pair of ring stop RSTPs not directly connected through the ring network are connected through a dedicated bus B1 (or B2) where packets are unlikely to compete with each other. Hence, the communication performance of packets may be improved as compared with a case where a packet is transferred between a pair of ring stop RSTPs connected to the core group CG via the ring network in the network-on-chip built in a CPU chip or the like. As a result, the performance of the arithmetic processing (calculation processing, data processing) may be improved.

The ring stops RSTP0 to RSTP3 each output only a packet issued by the corresponding nodes to the dedicated bus B1 (or B2), such that the packet issued by the corresponding nodes will not compete with a packet issued by the other nodes on the dedicated bus B1 (or B2). As a result, it is possible to improve the communication performance of a packet between the core groups CG opposite to each other across the ring network, as compared with a case where packets issued by other nodes are transferred to the dedicated bus B1 (or B2). In other words, in a case where one core group CG has insufficient arithmetic processing resources, arithmetic processing is performed using the core group CG that is opposite across the ring network; this will improve the packet communication performance, as compared with a case of using a core group CG other than the core group CG that is opposite across the ring network.

Furthermore, connecting through the dedicated bus B1 (or B2) between a pair of ring stop RSTPs having a distance smaller than a distance between another pair of ring stop RSTPs enables wiring the dedicated bus B1 (or B2) without arranging a register R. As a result, the number of transfer cycles of packets transferred on the dedicated bus B1 (or B2) may be reduced, and the packet communication performance may be improved. As a result, the performance of the arithmetic processing may further be improved.

As described above, in the CPU chip or the like, one of the ring stop RSTPs connected to a core group CG is connected to any one of the other ring stop RSTPs via the dedicated bus B1 (or B2) so as to improve the communication performance with a minimum chip size increase.

Furthermore, the ring stops RSTP connected to the respective core groups CG arbitrate between packets issued by the other core groups CG based on packet sender (transmission source) information, such that the equitability of arbitration between the packets that are in competition may be maintained.

Figure 13:
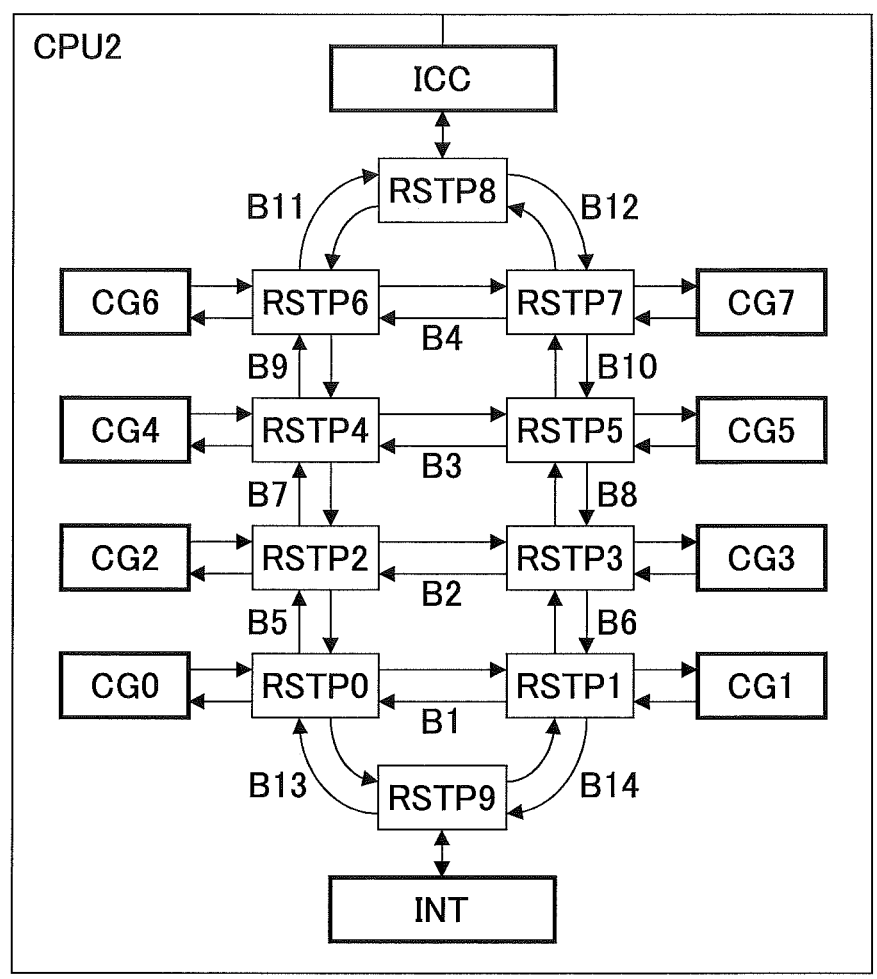
FIG. 13 is a diagram illustrating another embodiment of an arithmetic processing device, an information processing apparatus, and a control method of the arithmetic processing device.

FIG. 13 is a diagram illustrating another embodiment of an arithmetic processing device, an information processing apparatus, and a control method of the arithmetic processing device. Elements that are the same as or similar to those described in the embodiments illustrated in FIGS. 1 to 12 are denoted by the same reference numerals, and a detailed description of these elements will be omitted.

The CPU2 illustrated in FIG. 13 has eight core groups CG (CG0 to CG7), an interconnect controller ICC and an interrupt controller INT. Like the core groups CG0 to CG3 illustrated in FIG. 1, each of the core groups CG0 to CG7 has multiple processor cores C and a cache memory CMEM shared by the processor cores C.

Further, the CPU2 has ring stop RSTPs (RSTP0 to RSTP9) connected to the core groups CG0 to CG7, the interconnect controller ICC and the interrupt controller INT, respectively. The ring stops RSTP0 to RSTP7 connected to the respective core groups CG0 to CG7 are examples of the first router. The ring stops RSTP8 and RSTP9 respectively connected to the interconnect controller ICC and the interrupt controller INT are examples of the second router.

The CPU2 has buses B (B1 to B14) each connecting between the ring stops RSTP. In the example illustrated in FIG. 13, a ring network is constructed through the buses B5, B7, B9, B11, B12, B10, B8, B6, B14, and B13. The ring network connects the ring stops RSTP0, RSTP2, RSTP4, RSTP6, RSTP8, RSTP7, RSTP5, RSTP3, RSTP1, and RSTP9 in a ring shape. The buses B5, B7, B9, B11, B12, B10, B8, B6, B14, and B13 included in the ring network are examples of the first bus.

The ring stops RSTP0 and RSTP1 are mutually connected through a bus B1, and the ring stops RSTP2 and RSTP3 are mutually connected through a bus B2. The ring stops RSTP4 and RSTP5 are mutually connected through a bus B3, and the ring stops RSTP6 and RSTP7 are mutually connected through a bus B4. The bus B1 is a dedicated bus for transferring only packets issued by the core groups CG0 and CG1, and the bus B2 is a dedicated bus for transferring only packets issued by the core groups CG2 and CG3. The bus B3 is a dedicated bus for transferring only packets issued by the core groups CG4 and CG5, and the bus B4 is a dedicated bus for transferring only packets issued by the core groups CG6 and CG7. The buses B1, B2, B3 and B4 are examples of the second bus.

Each of the ring stops RSTP0 to RSTP7 operates in the same manner as the ring stops RSTP0 to RSTP3 described in FIGS. 1, 3 to 8, 10, and 11. That is, as illustrated in FIGS. 8, 10, and 11, each of the ring stops RSTP0 to RSTP7 performs control to maintain equitability of arbitration between packets that compete with each other. The ring stop RSTP8 operates in the same manner as the ring stop RSTP4 described in FIGS. 1 to 6, and the ring stop RSTP9 operates in the same manner as the ring stop RSTP5 described in FIG. 1.

For example, the CPU2 illustrated in FIG. 13 is installed in an information processing apparatus SV in place of each of the CPU0 and the CPU1 illustrated in FIG. 1. In the CPU2, in a case of the arithmetic processing being capable of being performed by the processor cores C included in only one core group CG, the arithmetic processing is performed within one core group CG in a manner similar to the case of the CPU0 illustrated in FIG. 1. In a case where arithmetic processing resources are insufficient with the processor cores C within one core group CG, processor cores C in a core group CG of the other node connected through the bus B1 (or B2, B3, or B4) are also used to perform arithmetic processing.

In addition, in a case of a pair of core groups having insufficient arithmetic processing resources, arithmetic processing is performed using three or more core groups CG. Furthermore, in a case of the arithmetic processing resources being insufficient with the core groups CG0 to CG7 of the CPU2, arithmetic processing is performed using core groups CG of another CPU2 installed in the information processing apparatus SV.

In a case where a pair of core groups CG transmit and receive packets via the dedicated bus B1 (or B2, B3, or B4), the occurrence of packet competition may be reduced as compared with a case where packets are transmitted and received via the ring network. Accordingly, the communication performance of packets may be improved.

As described in the above embodiment illustrated in FIG. 13, advantageous effects similar to those of the embodiments illustrated in FIGS. 1 to 12 may be obtained.

Figure 14:
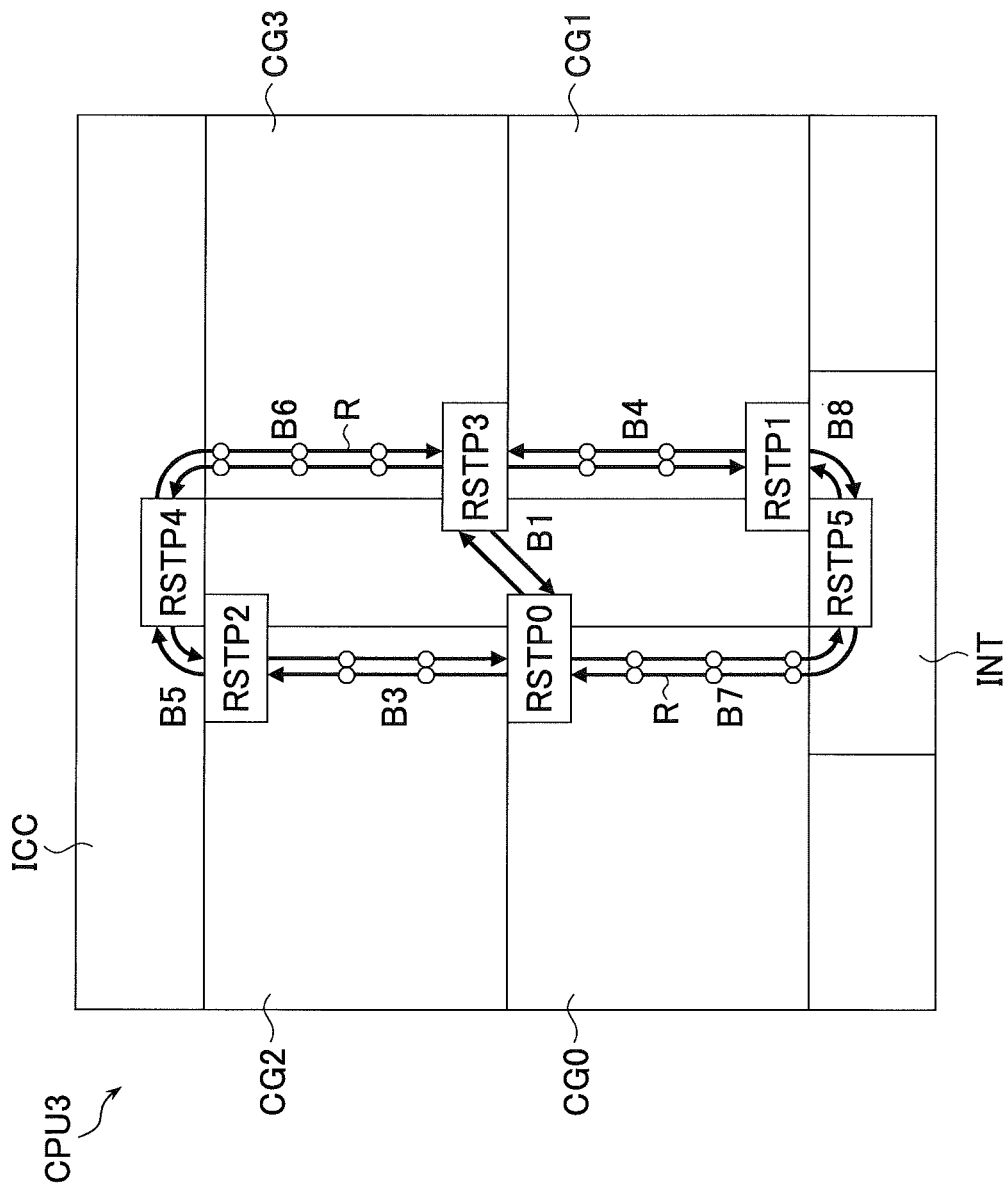
FIG. 14 is a diagram illustrating still another embodiment of an arithmetic processing device, an information processing apparatus, and a control method of the arithmetic processing device.

FIG. 14 is a diagram illustrating another embodiment of an arithmetic processing device, an information processing apparatus, and a control method of the arithmetic processing device. Elements that are the same as or similar to those described in the embodiments illustrated in FIGS. 1 to 12 are denoted by the same reference numerals, and a detailed description of these elements will be omitted.

A CPU3 illustrated in FIG. 14 has the arrangement of the ring stops RSTP0 and RSTP3 differing from the arrangement of the ring stops RSTP0 and RSTP3 in the CPU0 illustrated in FIG. 2; in the CPU3, the ring stops RSTP0 and RSTP3 are connected via a dedicated bus B1. Further, a dedicated bus is not connected to the ring stops RSTP1 and RSTP2, and the registers R are arranged on the buses B6 and B7. Other configurations and chip layout of the CPU3 are the same as those of the CPU0 illustrated in FIG. 1 and FIG. 2. That is, the CPU3 has four core groups CGs (CG0 to CG3), an interconnect controller ICC and an interrupt controller INT.

Each of the core groups CG0 to CG3 has multiple processor cores C and a cache memory CMEM shared by the processor cores C in a manner similar to the case illustrated in FIG. 1. For example, the CPU3 illustrated in FIG. 14 is installed in an information processing apparatus SV in place of each of the CPU0 and the CPU 1 illustrated in FIG. 1. An operation of each of the ring stops RSTP0 to RSTP3 is the same as the operation illustrated in FIGS. 3 to 8, 10, and 11. That is, as illustrated in FIGS. 8, 10, and 11, each of the ring stops RSTP0 to RSTP2 performs control to maintain equitability of arbitration between packets that compete with each other.

In FIG. 14, the bus B1 connects the ring stops RSTP0 and RSTP3 closest to each other, out of the ring stops RSTP0 to RSTP3 connected to the core groups CG0 to CG3. In other words, out of all possible pairings of the ring stops RSTP0 to RSTP3 that are not directly connected through the ring network, the bus B1 connects between a pair of ring stops RSTP0 and RSTP3, of which a distance between the pair of the ring stops RSTP0 and RSTP3 is shorter than a distance between any other pairing of other ring stops. The distance between the pair of the ring stops RSTP1 and RSTP2, which is longer than the distance between the pair of the ring stops RSTP0 and RSTP3, is not connected through a dedicated bus.

As described in the above embodiment illustrated in FIG. 14, advantageous effects similar to those of the embodiments illustrated in FIGS. 1 to 12 may be obtained.

According to one aspect of the embodiments, communication performance may be improved with minimal chip size increase.

The features and advantageous effects of the embodiments will become apparent from the detailed description of the embodiments. This is intended to cover the features and advantageous effects of the embodiments as described above without departing from the spirit and scope of the claims. In addition, those having ordinary skill in the art may readily conceive of various enhancements and modifications. Therefore, there is no intention to limit the scope of the embodiments having an inventive aspect to those described above, and it is also possible to rely on appropriate improvements and equivalents included in the range disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority or inferiority of the invention. Although the embodiments of the present invention have been described in detail, it should be understood that the various changes, substitutions, and alterations could be made hereto without departing from the scope of the invention as defined by the appended claims.

What is claimed is:

1. An arithmetic processing device comprising:
   a plurality of arithmetic processing units configured to perform arithmetic processing;
   a plurality of first routers connected to the plurality of arithmetic processing units, respectively;
   first buses connecting the plurality of first routers in a ring shape; and
   second buses each connecting between one of the plurality of first routers and one of a rest of the plurality of first routers from which the first routers directly connected through the first buses are excluded,
   when packets from the plurality of arithmetic processing units and from the second buses are in competition at one of the plurality of first routers, the one of the plurality of first routers selects one of the packets by arbitration and outputs the selected one of the packets to a corresponding one of the first buses by adding to the selected one of the packets a transmission source information indicating a transmission source of the selected one of the packets.

2. The arithmetic processing device according to claim 1, wherein a pair of first routers connected to each other through the second bus, among the plurality of first routers, output, to the first buses or the second buses, information pieces received from a pair of arithmetic processing units connected to the pair of first routers, among the plurality of arithmetic processing units, and prevent, from being output to the second buses, information pieces received from arithmetic processing units other than the pair of arithmetic processing units.

3. The arithmetic processing device according to claim 1, wherein a distance between a pair of first routers connected to each other through the second bus, among the plurality of first routers, is shorter than a distance between either one of the pair of first routers and another first router that is not directly connected to the either one of the pair of first routers through an interconnecting first bus.

4. The arithmetic processing device according to claim 1, wherein each of the plurality of first routers connected to a corresponding one of the plurality of arithmetic processing units equally selects information pieces by arbitration, upon information pieces issued to any of the arithmetic processing units connected to the corresponding first router, from the rest of the plurality of arithmetic processing units from which the arithmetic processing unit connected to the corresponding first router is excluded, being in competition.

5. The arithmetic processing device according to claim 1, wherein the plurality of arithmetic processing units, the plurality of first routers, the first buses, and the second buses are installed within a semiconductor chip.

6. The arithmetic processing device according to claim 1, further comprising:

at least one controller configured to control transfer of information pieces input to or output from the plurality of arithmetic processing units; and a second router disposed on the first bus and connected to the controller.

7. The arithmetic processing device according to claim 6, wherein the controller is connected to another arithmetic processing device via a transmission line and controls communication of information with the other arithmetic processing device.

8. The arithmetic processing device according to claim 6, wherein the controller controls interrupt processing based on an interrupt request issued by the plurality of arithmetic processing units.

9. The arithmetic processing device according to claim 1, wherein the first buses and the second buses each have a forward path and a return path.

10. An information processing apparatus comprising:
a plurality of arithmetic processing devices; and
a transmission line connecting the plurality of arithmetic processing devices to each other, wherein each of the plurality of arithmetic processing devices includes a plurality of arithmetic processing units configured to perform arithmetic processing;

a plurality of first routers connected to the plurality of arithmetic processing units, respectively;

first buses connecting the plurality of first routers in a ring shape; and second buses each connecting between one of the plurality of first routers and one of a rest of the plurality of first routers from which the first routers directly connected through the first buses are excluded, when packets from the plurality of arithmetic processing units and from the second buses are in competition at one of the plurality of first routers, the one of the plurality of first routers selects one of the packets by arbitration and outputs the selected one of the packets to a corresponding one of the first buses by adding to the selected one of the packets a transmission source information indicating a transmission source of the selected one of the packets.

11. A control method of an arithmetic processing device, the arithmetic processing device including a plurality of arithmetic processing units each performing arithmetic processing, a plurality of first routers connected to the plurality of arithmetic processing units, respectively, first buses connecting the plurality of first routers in a ring shape, and second buses each connecting between one of the plurality of first routers and one of a rest of the plurality of first routers from which the first routers directly connected through the first buses are excluded, the control method comprising:

causing a pair of first routers connected to each other through the second bus, among the plurality of first routers, to:

output, to the first buses or the second buses, information pieces received from a pair of arithmetic processing units connected to the pair of first routers, among the plurality of arithmetic processing units; and prevent, from being output to the second buses, information pieces received from arithmetic processing units other than the pair of arithmetic processing units, the control method further comprises causing, when packets from the plurality of arithmetic processing units and from the second buses are in competition at one of the plurality of first routers, the one of the plurality of first routers to:

select one of the packets by arbitration; and output the selected one of the packets to a corresponding one of the first buses by adding to the selected one of the packets a transmission source information indicating a transmission source of the selected one of the packets.

12. The control method according to claim 11, wherein each of the plurality of first routers connected to a corresponding one of the plurality of arithmetic processing units equally selects information pieces by arbitration, upon information pieces issued to any of the arithmetic processing units connected to the corresponding first router, from the rest of the plurality of arithmetic processing units from which the arithmetic processing unit connected to the corresponding first router is excluded, being in competition.

* * * * *